(12) United States Patent
Taguchi et al.

(10) Patent No.: US 12,365,087 B2
(45) Date of Patent: *Jul. 22, 2025

(54) DETERIORATION DIAGNOSIS APPARATUS FOR DIAGNOSING DETERIORATION IN A MECHANICAL APPARATUS, AND DETERIORATION DIAGNOSIS METHOD FOR DIAGNOSING DETERIORATION IN A MECHANICAL APPARATUS

(71) Applicant: KAWASAKI JUKOGYO KABUSHIKI KAISHA, Kobe (JP)

(72) Inventors: Koki Taguchi, Kobe (JP); Keiichi Yamanaka, Akashi (JP); Hiroyuki Yamamoto, Kobe (JP); Ryo Yamashita, Kobe (JP); Osamu Hisamatsu, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 279 days.

This patent is subject to a terminal disclaimer.

(21) Appl. No.: 18/157,022

(22) Filed: Jan. 19, 2023

(65) Prior Publication Data
US 2023/0150136 A1 May 18, 2023

Related U.S. Application Data

(63) Continuation of application No. 16/880,861, filed on May 21, 2020, now Pat. No. 11,577,394, which is a
(Continued)

(30) Foreign Application Priority Data

Nov. 22, 2017 (JP) .................................. 2017-224611
Mar. 22, 2018 (JP) .................................. 2018-055295

(51) Int. Cl.
*F16H 57/04* (2010.01)
*B25J 9/16* (2006.01)
(Continued)

(52) U.S. Cl.
CPC ........... *B25J 9/1674* (2013.01); *B25J 9/1651* (2013.01); *F16H 57/01* (2013.01);
(Continued)

(58) Field of Classification Search
CPC ....... B25J 9/1674; B25J 9/1651; F16H 57/01; F16H 57/0405
See application file for complete search history.

(56) References Cited

U.S. PATENT DOCUMENTS 4,262,530 A * 4/1981 Gerquest ................... G01F 1/00
73/861.08
5,270,684 A * 12/1993 Faraci, Jr. ............... G01F 9/001
377/21
(Continued)

*Primary Examiner* — Eric S. McCall
(74) *Attorney, Agent, or Firm* — METROLEX IP LAW GROUP, PLLC; Robert L. Scott, Esq.

(57) ABSTRACT

A deterioration diagnosis apparatus is for a mechanical apparatus including a power transmission mechanism that transmits power via a gear. The deterioration diagnosis apparatus includes: a storing unit that stores, in advance, a trend of change along with the operation of the mechanical apparatus, in consumption rate of an additive contained in lubricant used for the gear; and a determination unit that determines the period to be taken for the consumption rate of the additive to reach a predetermined value, based on the trend of change in the consumption rate of the additive.

20 Claims, 16 Drawing Sheets

Related U.S. Application Data continuation of application No. PCT/JP2018/043161, filed on Nov. 22, 2018.

(51) Int. Cl.
*F16H 57/01* (2012.01)
*G05B 19/4065* (2006.01)

(52) U.S. Cl.
CPC ..... *F16H 57/0405* (2013.01); *G05B 19/4065* (2013.01); *F16H 2057/012* (2013.01)

(56) References Cited

U.S. PATENT DOCUMENTS

| | | | | |
|---|---|---|---|---|
| 5,273,134 | A * | 12/1993 | Hegemier | G01F 23/60 123/196 S |
| 11,360,459 | B2 * | 6/2022 | Cella | G16Z 99/00 |
| 2002/0129645 | A1 * | 9/2002 | Konno | F01M 1/18 73/114.57 |
| 2005/0268692 | A1 * | 12/2005 | Delvigne | G21H 5/02 73/23.31 |
| 2008/0250846 | A1 * | 10/2008 | Taue | F01M 11/10 73/30.03 |
| 2009/0076677 | A1 * | 3/2009 | Walthall | F02C 7/00 701/100 |
| 2009/0107771 | A1 * | 4/2009 | Liu | F01M 11/12 184/7.4 |
| 2009/0326756 | A1 * | 12/2009 | Fletcher | G01M 15/044 701/31.4 |
| 2011/0010069 | A1 * | 1/2011 | Payne | F01D 21/003 701/100 |
| 2015/0192560 | A1 * | 7/2015 | Basu | G01N 33/2888 73/114.55 |
| 2017/0152776 | A1 * | 6/2017 | Butler | G01M 15/09 |
| 2021/0381409 | A1 * | 12/2021 | Oh | G01N 33/2888 |
| 2022/0090515 | A1 * | 3/2022 | Beecroft | F02C 9/00 |

* cited by examiner

DETERIORATION DIAGNOSIS APPARATUS FOR DIAGNOSING DETERIORATION IN A MECHANICAL APPARATUS, AND DETERIORATION DIAGNOSIS METHOD FOR DIAGNOSING DETERIORATION IN A MECHANICAL APPARATUS

CROSS REFERENCE TO RELATED APPLICATIONS

This application is a continuation of U.S. application Ser. No. 16/880,861, filed on May 21, 2020, which is a continuation application of International Application No. PCT/JP2018/043161, filed on Nov. 22, 2018, which claims priority based on the Article 8 of Patent Cooperation Treaty from Japanese Patent Applications No. 2017-224611, filed on Nov. 22, 2017, and No. 2018-055295, filed on Mar. 22, 2018, the entire contents of all of which are incorporated herein by reference.

BACKGROUND

The disclosure relates to a deterioration diagnosis apparatus for a mechanical apparatus, a deterioration diagnosis method for a mechanical apparatus performed in a deterioration diagnosis apparatus, and a deterioration diagnosis method for a mechanical apparatus performed by an operator.

For example, a large number of robots are used in production lines of line methods in the automobile industry or the like. Such a robot includes a large number of rolling-element bearings and speed reducers, and hence if these parts fail, the operation of the robot stops, causing a great impact on the production line. To prevent such serious damage, it is desired to perform preventive maintenance for finding parts likely to fail and repairing them before they fail. Abnormal conditions of the bearings and the speed reducers can be detected via online from the vibrations of these parts and abnormalities in the electric currents of the motors connected to these parts. However, when an abnormal condition occurs in the vibration or the electric current, the speed reducers or the like are often already in a condition just before a failure. Hence, the vibration and the electric current are not good enough for indicators used for preventive maintenance.

For rolling-element bearings and speed reducers, rotation parts or the like wear as the operation time increases, and the wear powder is mixed into lubricating grease. Since these parts often fail due to abnormal wear, and when abnormal wear occurs, a large amount of iron powder is mixed into the grease, methods have been developed for predicting the occurrence of a failure by measuring the amount of iron powder in the grease. For example, Japanese Patent Application Publication No. 2008-249549 (patent literature 1) discloses a failure prediction apparatus for online use that predicts the occurrence of a failure by detecting the iron powder content of the grease with a sensor integrated in a rolling-element bearing or a speed reducer.

SUMMARY

According to one or more aspects, a deterioration diagnosis apparatus for a mechanical apparatus including a power transmission mechanism that transmits power via a gear, may include: a storing unit that stores, in advance, a trend of change along with operation of the mechanical apparatus, in a consumption rate of an additive contained in lubricant used for the gear; and a determination unit that determines a period to be taken for the consumption rate of the additive to reach a predetermined value, based on the trend of change in the consumption rate of the additive. Here, the consumption rate of the additive means the rate of the amount of the precipitated additive relative to the additive content at the time of the product shipment. The lubricant may include lubricating grease and oil.

According to one or more aspects, deterioration diagnosis method for a mechanical apparatus that may be performed by a deterioration diagnosis apparatus comprising a storing unit and a determination unit, the deterioration diagnosis method may include: storing in the storing unit in advance, a trend of change along with operation of a mechanical apparatus, in a consumption rate of an additive contained in lubricant used for a gear, the mechanical apparatus comprising a power transmission mechanism that transmits power via the gear; and determining, with the determination unit, a period to be taken for the consumption rate of the additive to reach a predetermined value, based on the trend of change in the consumption rate of the additive. According to one or more aspects, a deterioration diagnosis method for a mechanical apparatus that may include a power transmission mechanism that transmits power via a gear, may include: measuring a consumption rate of an additive contained in lubricant used for the gear along with operation of the mechanical apparatus; deriving a trend of change in the consumption rate of the additive, based on a measurement value of the consumption rate of the additive; and determining a period to be taken for the consumption rate of the additive to reach a predetermined value, based on the trend of change in the consumption rate of the additive.

DETAILED DESCRIPTION

Knowledge (1) Underlying Invention

The inventors studied intensively to make it possible to predict highly accurately the remaining service lives of industrial robots having speed reducers. In a speed reducer used in an industrial robot, rotation parts or the like wear away as the operation time increases, and the wear powder is mixed in lubricating grease. These parts often fail due to abnormal wear, and when abnormal wear occurs, a large amount of iron powder is mixed in the grease. It is known that the amount of iron powder (wear volume) in the grease gradually increases as the wear progresses along with the operation of the speed reducer, and that before it fails, abnormal wear occurs, and iron powder rapidly increases. There has been a failure prediction method in which wear volume (the iron powder content of grease) is detected with a sensor based on the trend of change in such iron powder content to predict the occurrence of a failure. However, in such a conventional method, since the occurrence of a failure is predicted by detecting an abnormal increase in the amount of iron powder caused by abnormal wear, it is impossible to catch a trend of deterioration leading to a failure, in a stage before the stage of the occurrence of abnormal wear, and hence the accuracy in failure prediction has been limited.

Meanwhile, grease contains a certain amount of dissolved additive. The additive gradually solidifies along with the operation of the mechanical apparatus, and this degrades the performance of grease. Hence, the inventors focused attention on the deterioration in grease and conducted an endurance test on a speed reducer for industrial robots. For the industrial robot, a 6-axis articulated robot was used. The endurance test was conducted with the robot in a posture that caused a large load on the speed reducer and motor for the second joint. Specifically, the endurance test was conducted in a state in which the robot arm is extended approximately horizontally. In the course of the endurance test, wear was found in the speed reducer for the second joint. Check of the wear was conducted periodically by checking the concentration of iron powder in the grease in the speed reducer. In addition, the consumption rate of an additive contained in the grease was measured along with the check of the wear. Here, the consumption rate of the additive means the rate of the amount of the precipitated additive relative to the additive content at the time of the product shipment. The additive includes a friction modifier (MoDTP: Mo-based), an extreme pressure agent (ZnDTP: Zn-based), and an anti-wear agent. Here, element P was selected as an analysis target, and the amount of additive (P component) that was precipitated as sludge, which should have originally been dissolved, was measured by an X-ray fluorescence analysis method. Based on the measurement results, the consumption rate of the additive was calculated.

Figure 4:
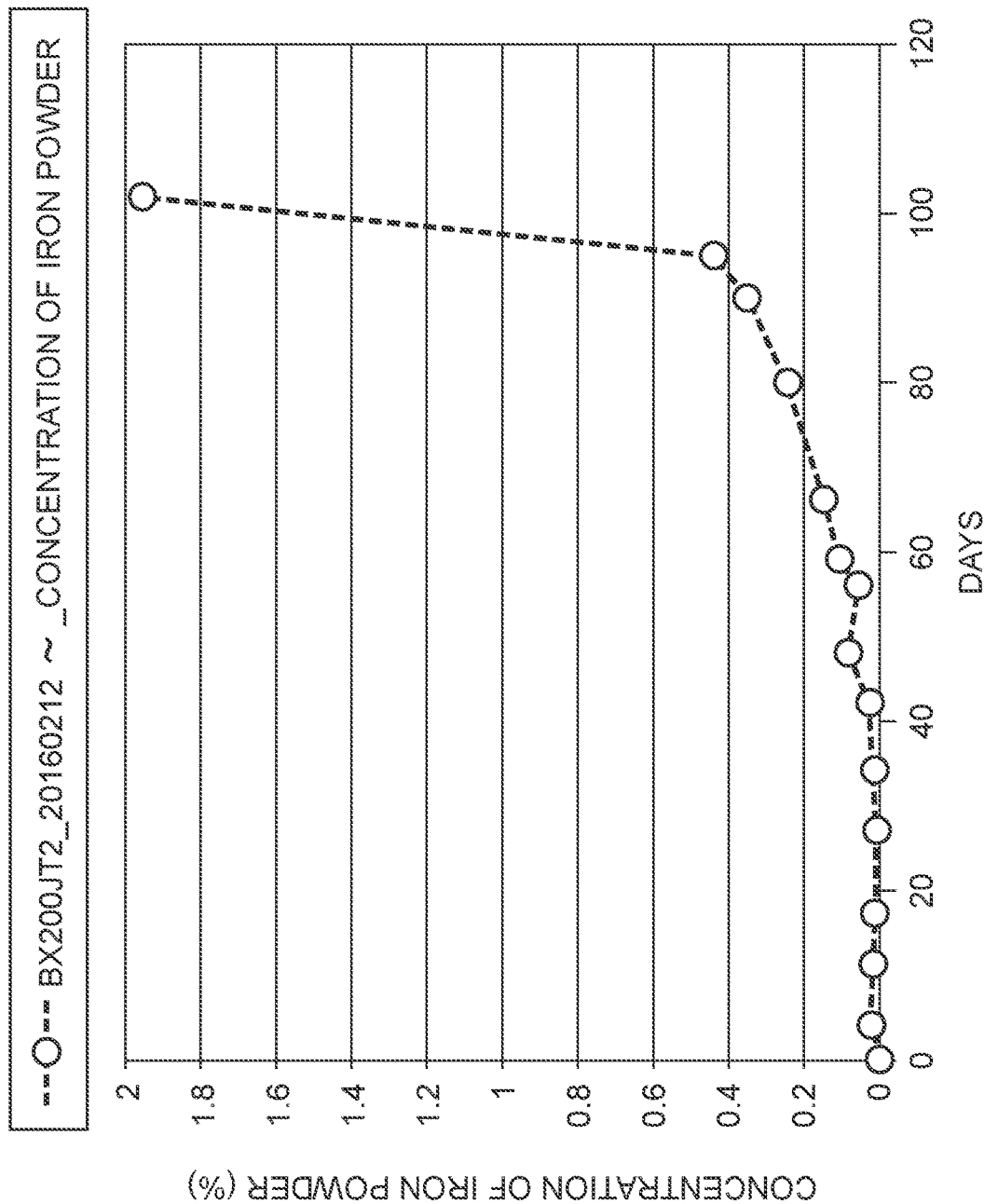
FIG. 4 is a graph illustrating a change over time in the concentration of iron powder in grease in an endurance test.
Figure 5:
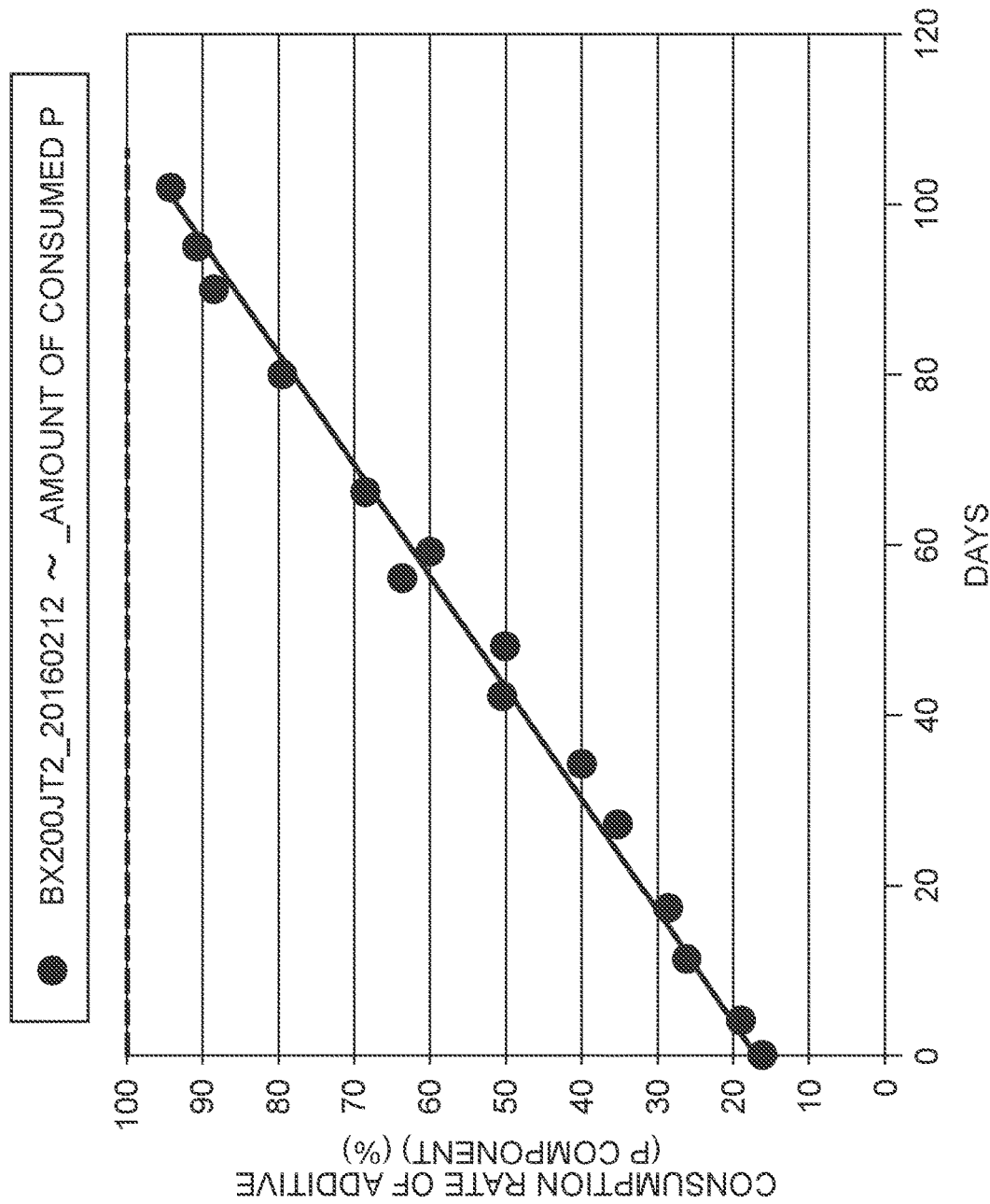
FIG. 5 is a graph illustrating a change over time in an additive consumption rate in the endurance test.
Figure 6:
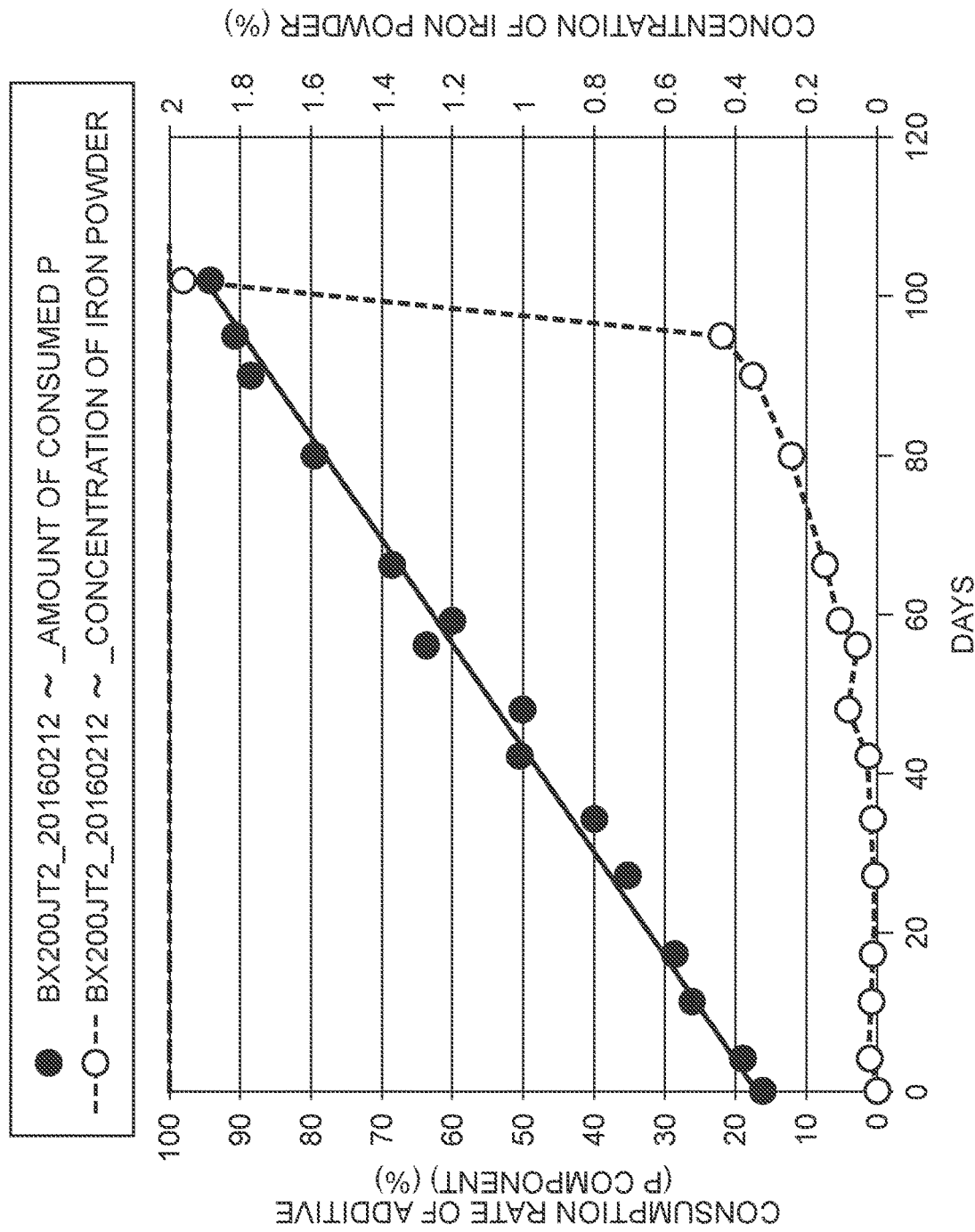
FIG. 6 is a graph illustrating the relationship between the concentration of iron powder and the additive consumption rate in the endurance test.

FIGS. 4 to 6 are graphs illustrating the measurement results of the endurance test. In FIGS. 4 to 6, the X axis represents the number of operating days of the speed reducer for the second joint (JT2) of the robot (machine name: BX200). FIG. 4 is a graph illustrating the change over time in the concentration (%) of iron powder contained in the grease in the endurance test. As illustrated in FIG. 4, the amount of iron powder in the grease (the wear volume) gradually increases with the progress of wear due to the operation of the speed reducer, and the amount of iron powder increases rapidly due to abnormal wear just before a failure occurs. FIG. 5 is a graph illustrating the change over time in the additive consumption rate (%) in the endurance test. As illustrated in FIG. 5, the consumption rate (%) of the additive (P component) increases linearly until 100 days have passed since the start of the test. Hence, it can be approximated with a straight line. In other words, the trend of change in the consumption rate of the additive can be known from the measurement results of the consumption rate of the additive. In the present embodiment, the inventors found that the trend of change in the consumption rate of the additive is linear increase.

FIG. 6 is a graph illustrating the relationship between the concentration of iron powder and the additive consumption rate. In FIG. 6, the white circles represent the measurement results of the concentration (%) of iron powder in FIG. 4, and the black dots represent the measurement results of the additive consumption rate (%) in FIG. 5. As illustrated in FIG. 6, the concentration of iron powder increases gradually with the progress of wear due to the operation of the speed reducer, and the amount of iron powder increases rapidly due to abnormal wear just before a failure occurs. In contrast, the consumption rate of the additive increases linearly. In other words, the additive is consumed linearly until the rapid increase in the wear volume (the concentration of iron powder) just before the failure, and when the additive is consumed completely (a consumption rate of 100%), a failure (abnormal wear) occurs.

Figure 7:
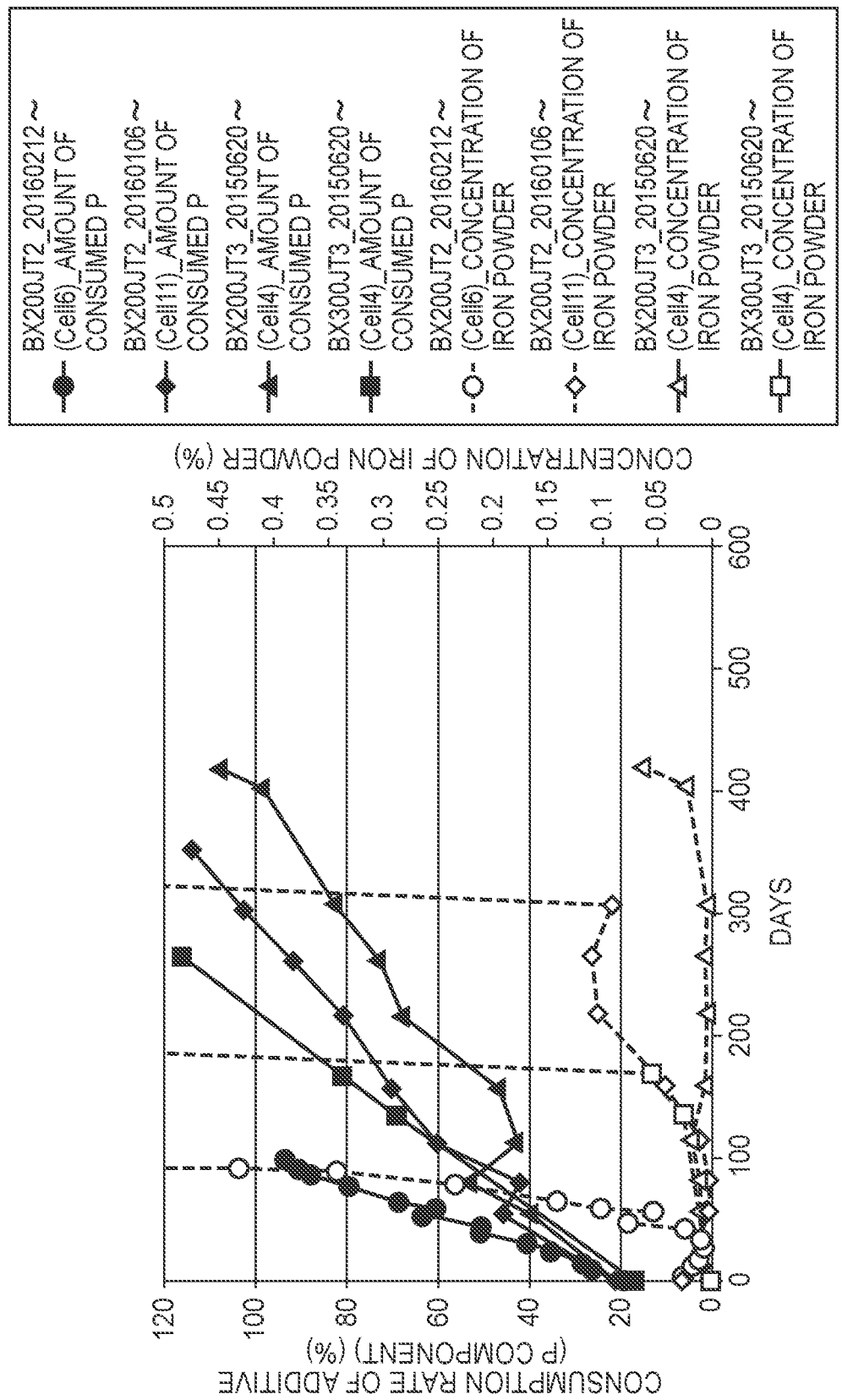
FIG. 7 is a graph illustrating the relationship between the additive consumption rate and the concentration of iron powder in endurance tests with different conditions.

To confirm the validity of the above endurance test results, the inventors conducted additional tests with different conditions. Specifically, the type of robot, the installation place of the joint and the robot, and the time of tests were changed. FIG. 7 is a graph illustrating the relationship between the additive consumption rate and the concentration of iron powder in the endurance tests conducted with different conditions. As illustrated in FIG. 7, even for a speed reducer for the same joint (JT2), if the type of robot is different (machine name: BX300), the numerical values of the additive consumption rate are different. In addition, even though the type of robot is the same (machine name: BX200), if a speed reducer is for a different joint (JT3), the measurement values of the additive consumption rate are different. The inventors found from the measurement results that the additive consumption rate always has a trend to increase linearly even if the type of robot or the speed reducer is different. Note that the statement that the trend of change in the consumption rate of the additive is linear increase is not limited to linear increase in a strict sense. The measurement results in FIG. 7 include a case in which after the measurement value increases, it once slightly decreases, and then the measurement value increases linearly. Such a case is also included in the linear increasing trend because this case can be approximated with one or two or more straight lines. From the results of these endurance tests, the inventors found a change trend that the additive is linearly consumed until the rapid increase, just before the failure, in the wear volume (the concentration of iron powder) in the speed reducer and also found that the failure (abnormal wear) is caused by the complete consumption (consumption rate of 100%) of the additive.

With this knowledge, if the trend of a linear change in the consumption rate of the additive is stored in advance, a trend of deterioration leading to a failure can be caught in a stage before abnormal wear occurs, and thus mechanical apparatuses can be diagnosed in terms of deterioration based on the trend of change in the consumption rate of the additive.

Note that the above knowledge can be obviously applied to deterioration diagnosis for not only robots having bearings and speed reducers but also mechanical apparatuses (for example, hydraulic pumps) having transmission mechanisms that transmit power via gears.

The inventors conceived the invention based on the above knowledge. Hereinafter, one or more embodiments are described with reference to attached drawings. In the following, the same or equivalent constituents are denoted by the same reference symbols in all the drawings, and repetitive description thereof is omitted.

First Embodiment

[Configuration]

Figure 1:
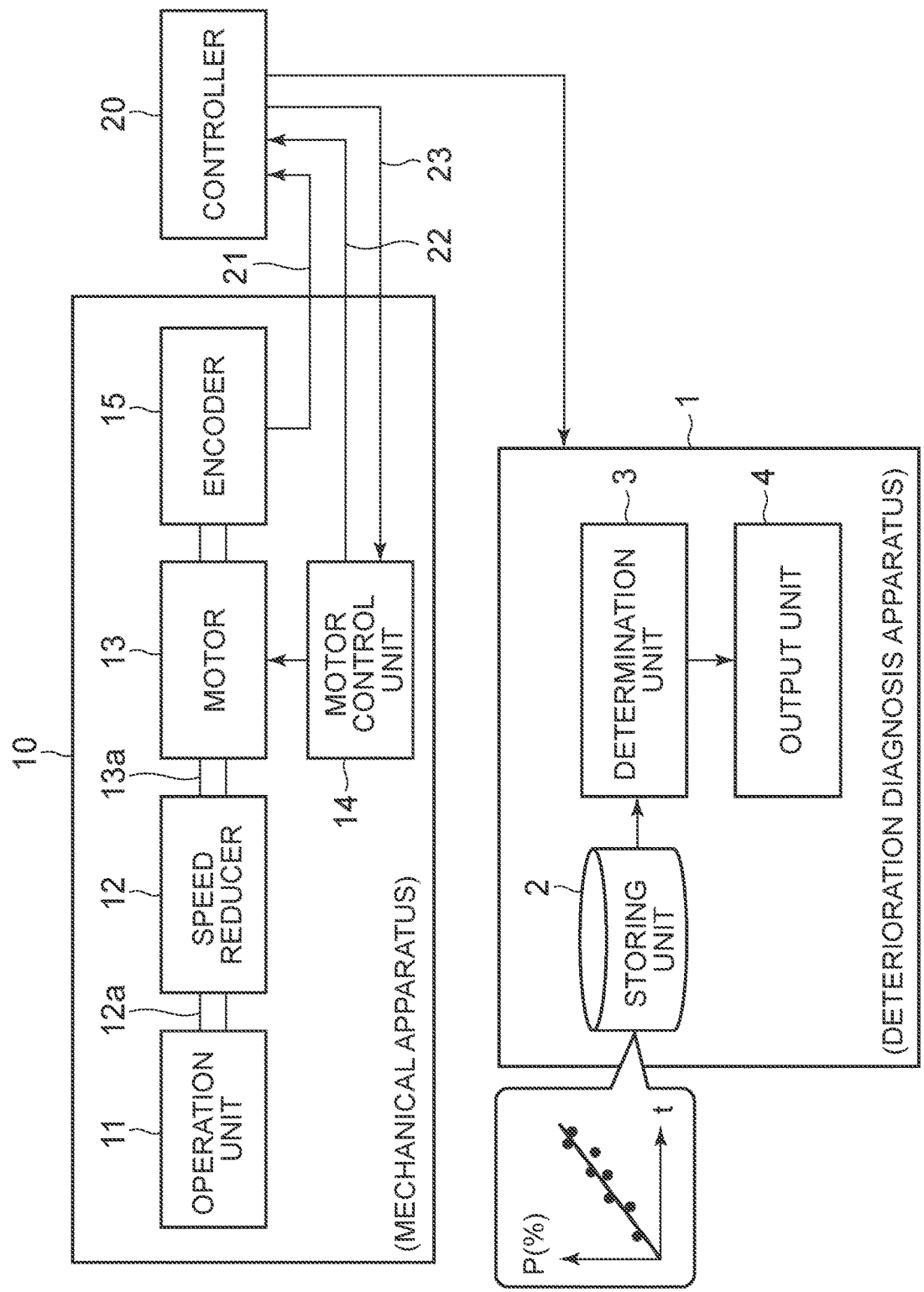
FIG. 1 is a functional block diagram illustrating the configuration of a deterioration diagnosis apparatus for a mechanical apparatus according to one or more embodiments.

FIG. 1 is a functional block diagram illustrating the configuration of a deterioration diagnosis apparatus for a mechanical apparatus according to one or more embodiments. First, description is made of a speed reducer 12 which is a target of a deterioration diagnosis apparatus 1 and a mechanical apparatus 10 including the speed reducer 12.

The mechanical apparatus 10 includes an operation unit 11, a motor 13 that drives the operation unit 11, the speed reducer 12 that reduces the speed of the rotational power of the motor 13 and transmits it to the operation unit 11, an encoder 15 that detects the rotation position of the motor 13, and a motor control unit 14 that controls the electric power (in this case, the electric current) supplied to the motor 13 to control the rotation of the motor 13.

The mechanical apparatus 10 may be of any kind including an operation unit 11. The mechanical apparatus 10 is typically an industrial robot. Other than this, examples of the mechanical apparatus 10 include machine tools.

The speed reducer 12 may be of any kind that reduces the speed of the rotational power of the motor 13 and transmits it to the operation unit 11. The speed reducer 12, for example, reduces the speed of the rotational power of the input shaft with a speed reduction mechanism (not illustrated) and outputs the rotational power the speed of which is reduced to an output shaft 12a. In FIG. 1, a rotary shaft 13a of the motor 13 is illustrated as an example of the input shaft, but the input shaft may be, for example, the output shaft of another operation unit. A typical example of the speed reduction mechanism is a gear speed-reduction mechanism, but the speed reduction mechanism may be of a different type. In the present embodiment, a grease is used as a lubricant for gears of the speed reducer 12, but the lubricant may be a lubricating oil.

The motor 13 is a servo motor, which may be a brushless motor or a DC motor. The motor 13 may also be of a different type, such as an induction motor. In a case where a servo motor is used, the encoder 15 is parallelly used for the position control of the operation unit 11. The motor 13 may be placed at a stationary part or a moving part of the mechanical apparatus 10. For an industrial robot, since the motor 13 is provided at each joint to drive an arm member that is more distal than the joint, except the case of a first joint, the motor 13 is provided on a moving part for each joint, except the case of a first joint. In the case of the first joint, the motor 13 is provided at a stationary part.

The encoder 15 is provided on the rotary shaft 13a of the motor 13. The encoder 15 may be of any kind that detects the rotation angle 21 (rotation position) of the motor 13. In a case where the motor 13 is an induction motor or the like, and the position control of the operation unit 11 is not performed, for example, a revolution number detector is used instead of the encoder 15.

The motor control unit 14 supplies the motor 13 with the electric power the voltage or current of which is controlled (current is controlled in FIG. 1) to drive the motor 13. Since the motor control unit 14 is one well known, concrete description thereof is omitted. In FIG. 1, the motor control unit 14 includes a current sensor (not illustrated), which detects the electric current (the load current of the motor 13) supplied to the motor 13 and outputs the detected current 22 to a controller 20. The current sensor may be positioned outside the motor control unit 14.

The controller 20 generates an electric-current instruction value 23 based on the rotation angle 21 of the motor 13 inputted from the encoder 15 and motor current 22 inputted from the current sensor of the motor control unit 14 and outputs the electric-current instruction value 23 to the motor control unit 14. The controller 20 is typically a robot controller. The motor control unit 14 outputs the electric power with a current corresponding to the electric-current instruction value 23 to the motor 13. In this way, the controller 20 performs feedback control on the rotation angle and torque of the motor 13.

Next, the deterioration diagnosis apparatus 1 is described. The deterioration diagnosis apparatus 1 diagnoses the mechanical apparatus 10 in terms of deterioration based on the trend of change in the consumption rate of the additive. In the present embodiment, the deterioration diagnosis apparatus 1 includes a computing apparatus. Examples of the computing apparatus include not only ones that operate according to programs (software), such as a personal computer and a micro controller, but also hardware such as a logic circuit, an electronic circuit, and the like. The deterioration diagnosis apparatus 1 here includes a computer that operates according to programs. The deterioration diagnosis apparatus 1 (computer) includes a calculation unit and a storing unit and performs specified operation by the calculation unit reading and executing a specified program stored in the storing unit. The deterioration diagnosis apparatus 1 includes a storing unit 2, a determination unit 3, and an output unit 4. The determination unit 3 is a functional unit that is implemented by the forgoing specified program being executed, and actually the above computer functions as the determination unit 3. The deterioration diagnosis apparatus 1 in the present embodiment is communicably connected to the controller 20 and configured to be capable of receiving data on the operation state of the mechanical apparatus 10.

The storing unit 2 stores, in advance, data on the trend of change along with the operation of the speed reducer 12, in the consumption rate of the additive contained in the grease used for the gears. The data stored in the storing unit 2 is used in deterioration diagnosis described later.

The determination unit 3 determines the period to be taken for the consumption rate of the additive to reach a predetermined value based on the trend of change in the consumption rate of the additive. In the present embodiment, the determination unit 3 obtains data on the operation state of the mechanical apparatus 10 from the controller 20 and calculates the current additive consumption rate based on the trend of change in the consumption rate of the additive stored in the storing unit 2. Then, the determination unit 3 calculates the period to be taken for the current additive consumption rate to reach a threshold set in advance and determines the remaining time for use (or the remaining service life of the grease).

The output unit 4 outputs the determination result (the remaining time for use or the remaining service life of the grease) by the determination unit 3. The output unit 4 includes, for example, a display that displays the determination result or an alarm, a transmitter that transmits the determination result to the outside, a printer that prints the determination result, and the like.

[Operation]

Figure 2:
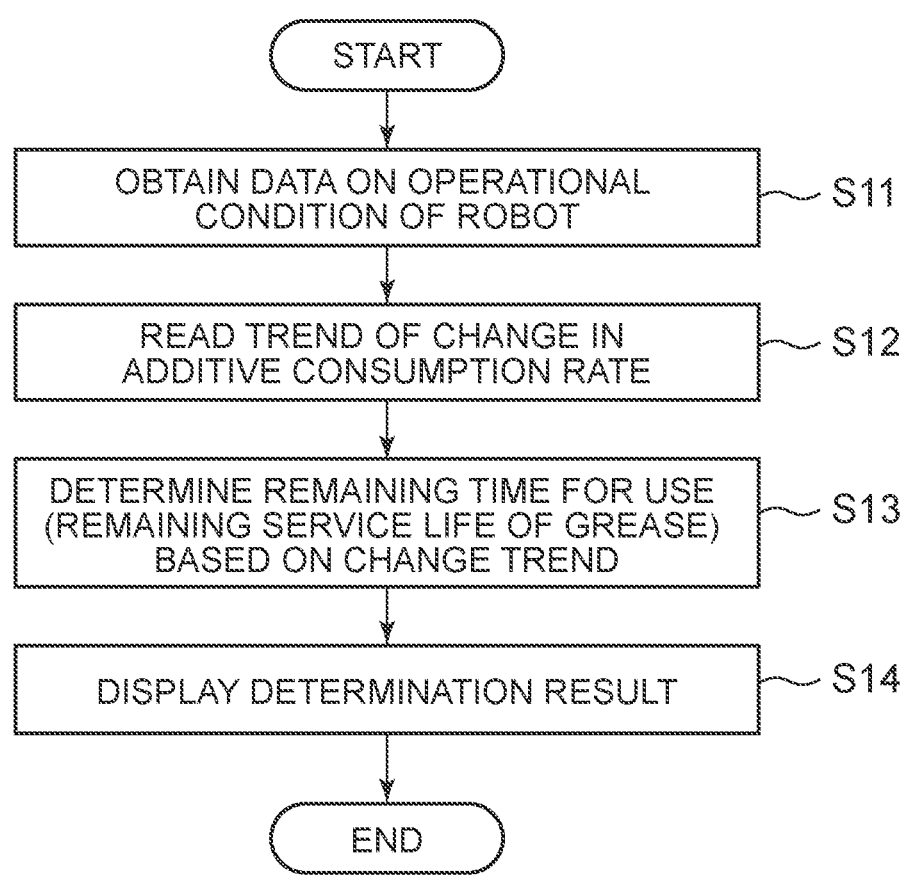
FIG. 2 is a flowchart illustrating an example of the operation of a deterioration diagnosis apparatus, such as shown in FIG. 1.

Next, the operation of the deterioration diagnosis apparatus 1 configured as above is described. The operation of the deterioration diagnosis apparatus 1 also means a deterioration diagnosis method according to the present embodiment. FIG. 2 is a flowchart illustrating the operation of a deterioration diagnosis apparatus 1, such as shown in FIG. 1. Prior to the operation, the trend of change along with the operation of the speed reducer 12, in the consumption rate of the additive contained in the grease used for the gears is stored in advance in the storing unit 2 of the deterioration diagnosis apparatus 1.

First, the operation of the robot, which is the mechanical apparatus 10, is started. In this state, the deterioration diagnosis apparatus 1 obtains data on the operation state (the number of cycles) of the mechanical apparatus 10 (robot) from the controller 20 (step S11 in FIG. 2).

Figure 3:
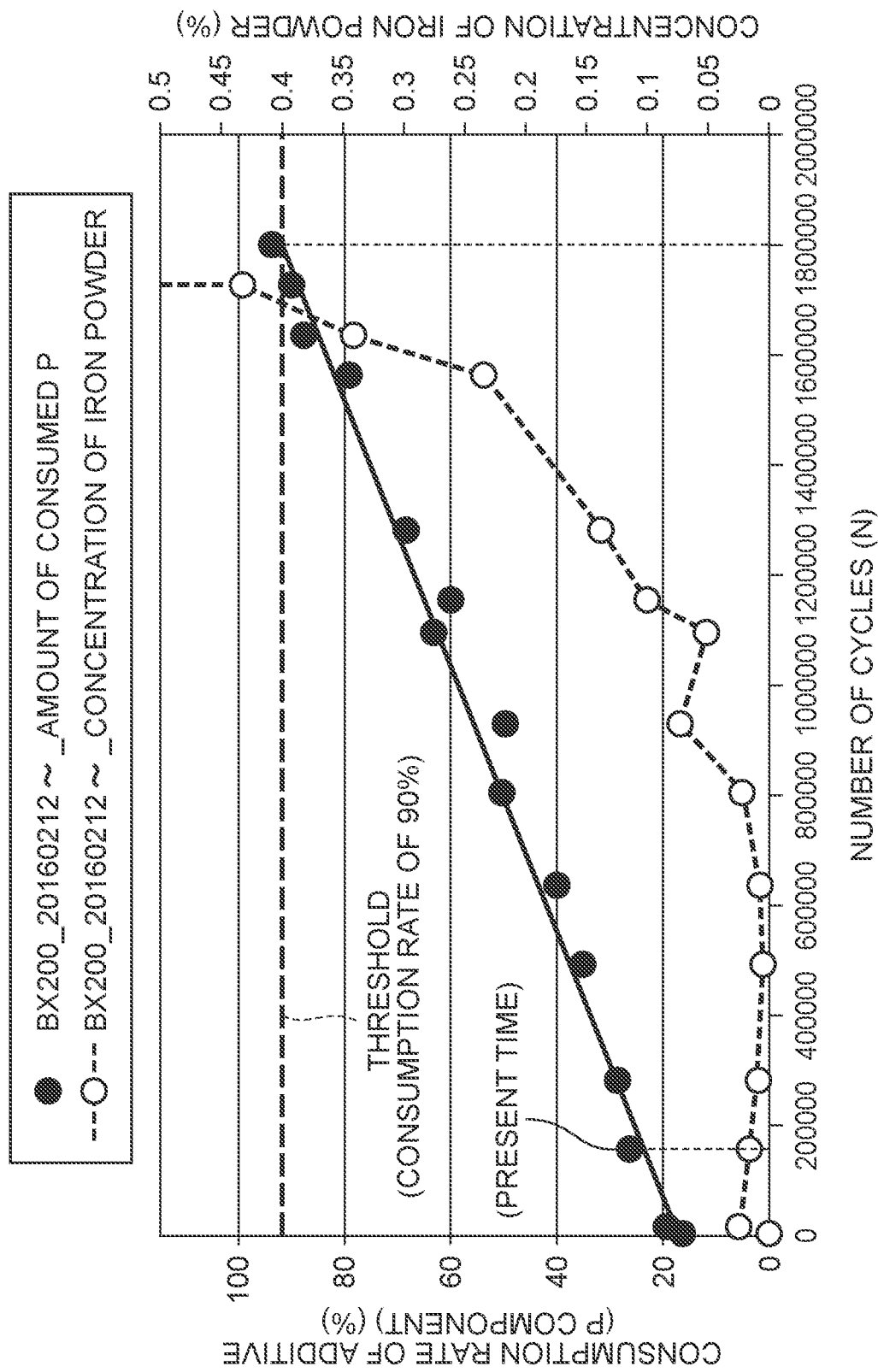
FIG. 3 is a graph illustrating the trend of change in the consumption rate of an additive used in a deterioration diagnosis apparatus, such as shown in FIG. 1.

Next, the deterioration diagnosis apparatus 1 reads data on the trend of change in the additive consumption rate stored in advance in the storing unit 2 (step S12 in FIG. 2). FIG. 3 is a graph illustrating an example of data on the trend of change in the additive consumption rate. Note that the data of FIG. 3 was made based on the results of the above endurance test (see FIG. 6). In FIG. 3, the X axis represents the operation (the number of cycles) of the speed reducer 12 for the second joint (JT2) of the robot (machine name: BX200), and the Y axis represents the concentration (%) of iron powder contained in the grease used in the speed reducer 12 and the consumption rate (%) of the additive (P component). As illustrated in FIG. 3, the trend of change in the consumption rate of the additive is linear increase and is approximated with a straight line.

Next, the deterioration diagnosis apparatus 1 diagnoses the mechanical apparatus 10 in terms of deterioration based on the trend of change in the consumption rate of the additive. Specifically, the determination unit 3 determines the period to be taken for the consumption rate of the additive to reach a predetermined value (step S13 in FIG. 2). The determination unit 3 obtains data on the operation state of the mechanical apparatus 10 (robot) from the controller 20 and calculates the current consumption rate of the additive (30% in FIG. 3) based on the trend of change in the consumption rate of the additive (a straight line in FIG. 3) read from the storing unit 2. Then, the determination unit 3 calculates the period to be taken for the additive consumption rate to reach a threshold set in advance (additive consumption rate of 90% in FIG. 3) from the current additive consumption rate (30% in FIG. 3) and determines the remaining time for use (or the remaining service life of the grease). Although the threshold of the additive consumption rate is set to 90% in the present embodiment, the threshold may be changed as appropriate depending on the type of grease, the components of a speed reducer, and other factors.

Lastly, the deterioration diagnosis apparatus 1 outputs the determination result (step S14 in FIG. 2). Specifically, the output unit 4 outputs the determination result (the remaining time for use or the remaining service life of the grease) determined by the determination unit 3. Although the deterioration diagnosis method according to the present embodiment (see FIG. 2) is an operation of the deterioration diagnosis apparatus 1 performed in the deterioration diagnosis apparatus 1 (see FIG. 1), the deterioration diagnosis method of the present embodiment may be performed by an operator. For example, all the operation in steps S11 to S14 in FIG. 2 may be performed by an operator, or part of the operation (for example, in steps S12 and S13) may be performed by an operator. In the case where an operator performs the deterioration diagnosis method, the method may include the step of measuring the consumption rate of the additive described above and the step of deriving the trend of change in the consumption rate of the additive, based on the measurement values of the consumption rate of the additive.

[Operational Advantage]

In the present embodiment as above, since the trend of change along with the operation of the mechanical apparatus 10, in the consumption rate of the additive is stored in advance, and a trend of deterioration leading to a failure can be caught in a stage before abnormal wear occurs, it is possible to diagnose the mechanical apparatus in terms of deterioration based on the trend of change in the consumption rate of the additive. The remaining service life of the mechanical apparatus 10 can be predicted with high accuracy by determining the period to be taken for the consumption rate of the additive to reach a threshold set in advance.

Since the trend of change in the consumption rate of the additive is linear increase, the trend of change in the consumption rate of the additive can be approximated with a straight line (see FIG. 3). This makes it easy to determine the period to be taken for the consumption rate of the additive to reach the threshold set in advance.

Knowledge (2) Underlying Invention

Figure 12:
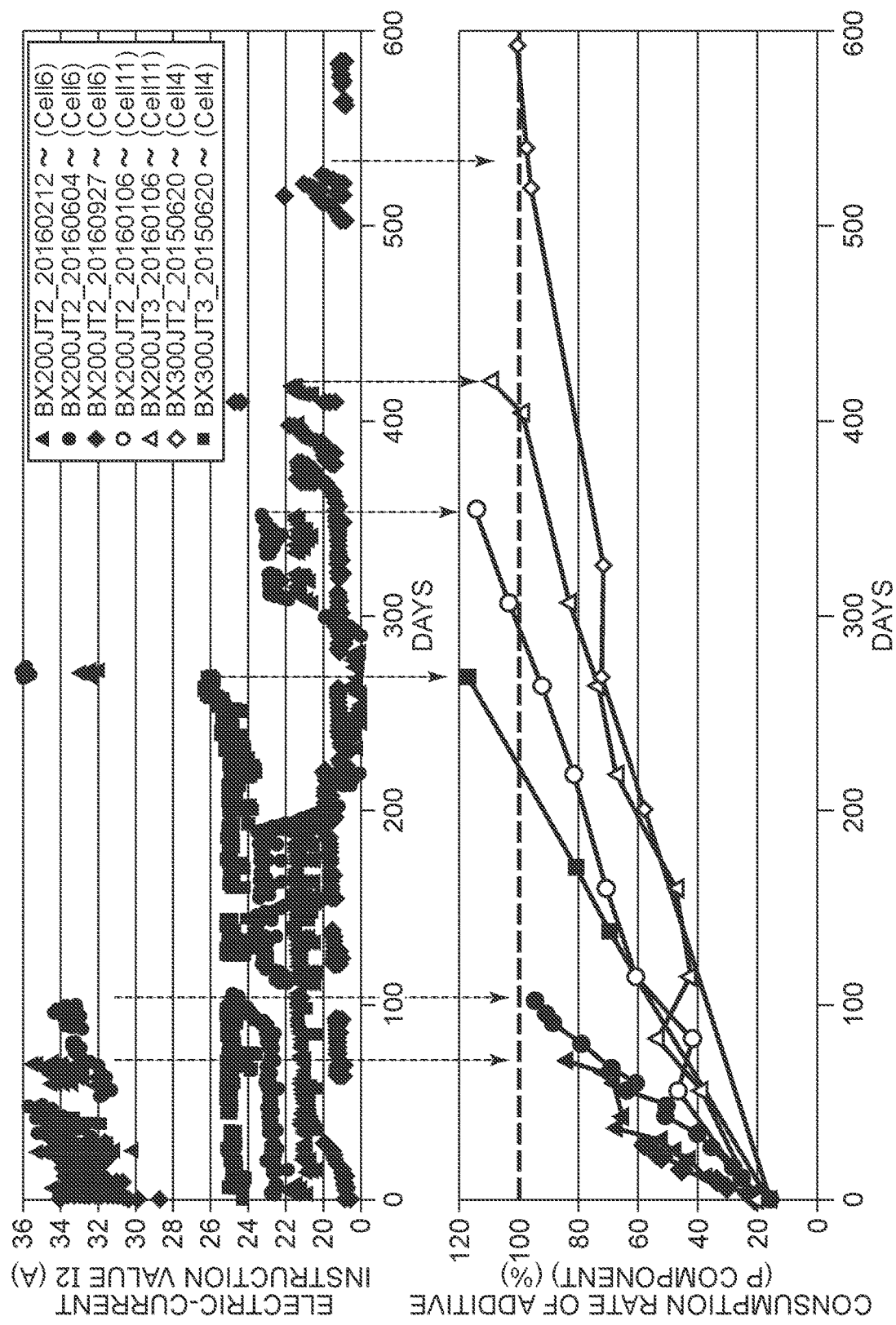
FIG. 12 is a graph illustrating changes over time in the electric-current instruction value and the additive consumption rate in endurance tests conducted with different loads.

The inventors studied intensively to further improve the accuracy in predicting the remaining service lives of robots. In general, in the case where an industrial robot performs multiple kinds of actions, the output varies according to the load. Hence, the inventors conducted an endurance test of the speed reducer for an industrial robot several times applying a different load to the speed reducer and the motor. FIG. 12 is a graph illustrating the relationship between the electric-current instruction value and the additive consumption rate in the endurance tests conducted multiple times with different loads. The upper graph illustrates the change over time in the electric-current instruction value I2 (A) in the endurance tests. The lower graph illustrates the change over time in the measurement value of the additive consumption rate (%) according to the electric-current instruction value I2(A). Here, the electric-current instruction values I2 are effective values, but the electric-current instruction values I2 may be peak values or actual currents (actually measured values).

As illustrated in a graph of FIG. 12, in the case where electric-current instruction value I2 (A) in in the range of 30 to 36 (A), the additive was consumed approximately linearly, and the additive consumption rate (%) reached the complete consumption after operation around 100 days. In the case where electric-current instruction value I2 (A) is in the range of 24 to 26 (A), the additive was consumed approximately linearly, and the additive consumption rate (%) reached the complete consumption after operation over 250 days. In the case where electric-current instruction value I2 (A) is in the range of 22 to 24 (A), the additive was consumed approximately linearly, and the additive consumption rate (%) reached the complete consumption after operation over 350 days. In the case where electric-current instruction value I2 (A) is in the range of 20 to 22 (A), the additive was consumed approximately linearly, and the additive consumption rate (%) reached the complete consumption after operation over 400 days. In the case where electric-current instruction value I2 (A) is in the range of 18 to 20 (A), the additive was consumed approximately linearly, and the additive consumption rate (%) reached the complete consumption after operation over 500 days.

Of the components contained in the additive, the inventors conducted a test on the consumption rate of each of the extreme pressure agent and the friction modifier and confirmed the validity. As a result, the inventors confirmed the linearity of the consumption rate of the extreme pressure agent and the correlation between the extreme pressure agent and the electric-current instruction value. On the other hand, the consumption rate of the friction modifier decreased rapidly with the electric-current instruction value I2 (A), and thus the inventors found no correlation between the friction modifier and the electric-current instruction value. From the results, the inventors have concluded that, of the components of the additive, the extreme pressure agent (consumption rate) greatly contributes deterioration diagnosis. Hence, in the following, the consumption rate of the additive means the consumption rate of the extreme pressure agent in a strict sense. Note that the extreme pressure agent may include an anti-wear agent.

Figure 13:
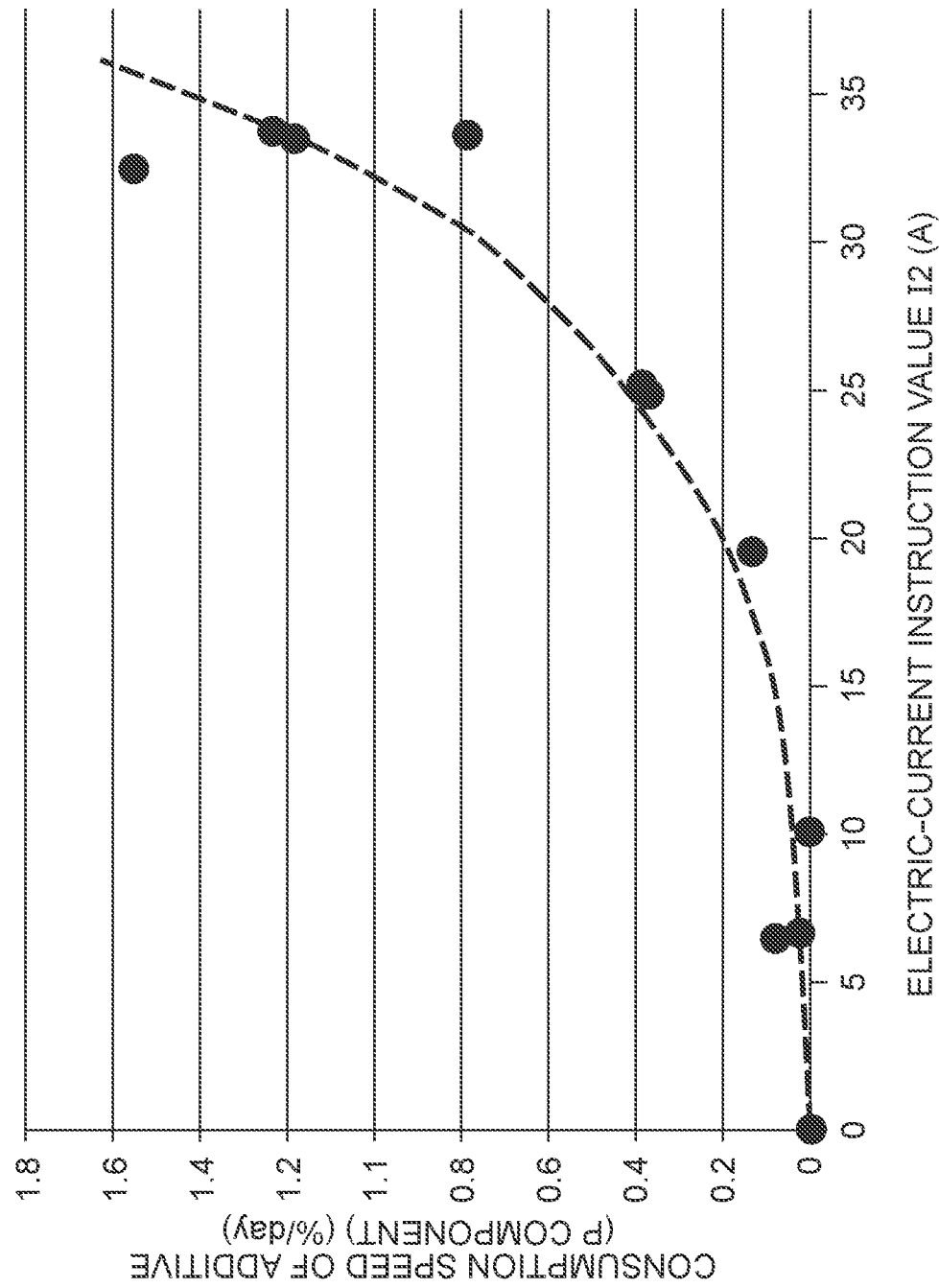
FIG. 13 is a graph illustrating the relationship between the electric-current instruction value and the additive consumption speed in the endurance tests illustrated in FIG. 12.

As described above, the additive is consumed approximately linearly according to the electric-current instruction value I2 (A). A large electric-current instruction value I2 (A) means a large load (output), leading to a high consumption speed of the additive, and the smaller the electric-current instruction value I2 (A), the lower the consumption speed of the additive. FIG. 13 is a graph illustrating the relationship between the electric-current instruction value I2 (A) in the endurance test of FIG. 12 and the additive consumption speed (%/day) based on the measurement values of the additive consumption rate (%) in the endurance test of FIG. 12. In FIG. 13, the dots in the graph represent the measurement values, and the dashed line represents the relational expression derived by a regression analysis. Here, relational expression (1) that can express the relationship between the electric-current instruction value I2 (A) and the additive consumption speed (%/day) was derived by the least square method.

$$\text{additive consumption speed (\%/day)} = R \times (I2)^2 \quad (1)$$

Here, R is a coefficient, and I2 is an average value of electric-current instruction values. According to expression (1), the additive consumption speed (%/day) can be expressed by a quadratic function (parabolic curve) of the electric-current instruction value I2 (A). Since the additive consumption speed (%/day) is based on the measurement values of the additive consumption rate (%), the relationship between the additive consumption speed (%/day) and the electric-current instruction value I2 (A) is not limited to the case in which the relationship can be expressed by a quadratic function (parabolic curve) in a strict sense, but the relationship may be of any kind that can be expressed by a certain correlation. The inventors found from the results of the endurance tests that there is a correlation between the electric-current instruction value I2 (A) and the additive consumption rate (%).

According to this knowledge, the consumption rate of the additive in industrial robots can be expressed by a function of the motor electric-current instruction value. Hence, if the electric-current instruction value is always monitored, and the time integral value of the function is calculated, the remaining service life of the robot can be predicted with high accuracy.

Note that the above knowledge can obviously be applied not only to robots having bearings and speed reducers but also to mechanical apparatuses (for example, hydraulic pumps) having transmission mechanisms that transmit power via gears.

The inventors conceived the present invention based on the above knowledge. Hereinafter, one or more embodiments are described with reference to attached drawings. In the following, the same or equivalent constituents are denoted by the same reference symbols in all the drawings, and repetitive description thereof is omitted.

Second Embodiment

Next, a second embodiment is described. The basic configuration of a deterioration diagnosis apparatus according to the present embodiment is the same as or a similar to that of the first embodiment. In the following, description of the configurations of constituents in common with the first embodiment is omitted, and only different configurations are described.

Figure 8:
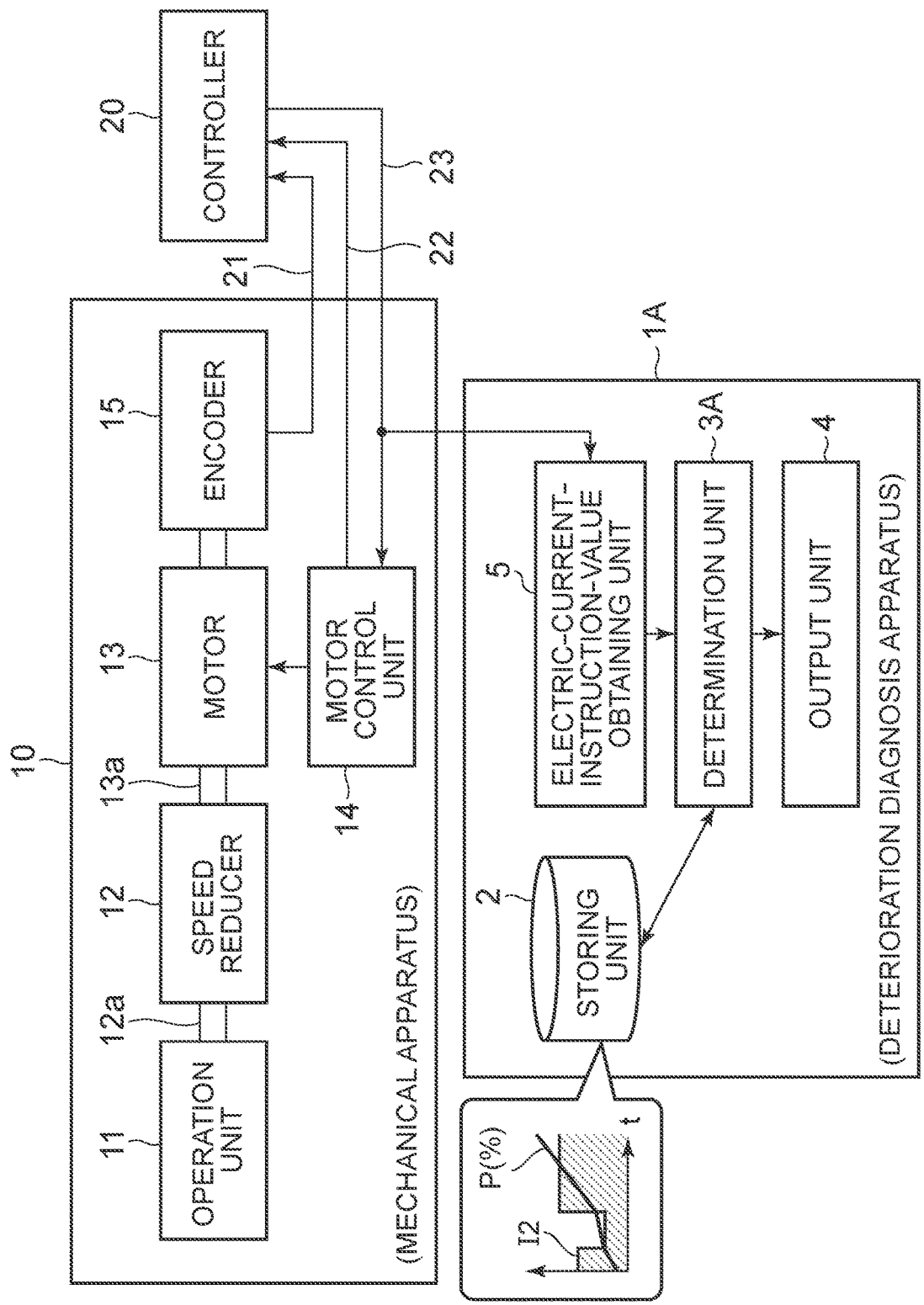
FIG. 8 is a functional block diagram illustrating the configuration of a deterioration diagnosis apparatus for a mechanical apparatus according to one or more embodiments.

FIG. 8 is a functional block diagram illustrating the configuration of a deterioration diagnosis apparatus 1A according to one or more embodiments. As illustrated in FIG. 8, this embodiment may be different from the first embodiment (FIG. 1) in that the deterioration diagnosis apparatus 1A includes an electric-current-instruction-value obtaining unit 5 that obtains time series data on the electric-current instruction value.

The electric-current-instruction-value obtaining unit 5 here obtains the electric-current instruction value 23 inputted from the controller 20 (and stores it temporarily). The electric-current instruction value is instruction signals according to the deviation of the measurement value of the load current of the motor, and hence, use of the electric-current instruction value provides results comparable to use of the load current of the motor.

The determination unit 3A calculates the time integral value of the function based on time series data on the electric-current instruction value obtained by the electric-current-instruction-value obtaining unit 5 and determines the period to be taken for the consumption rate of the additive to reach a predetermined value.

[Operation]

Figure 9:
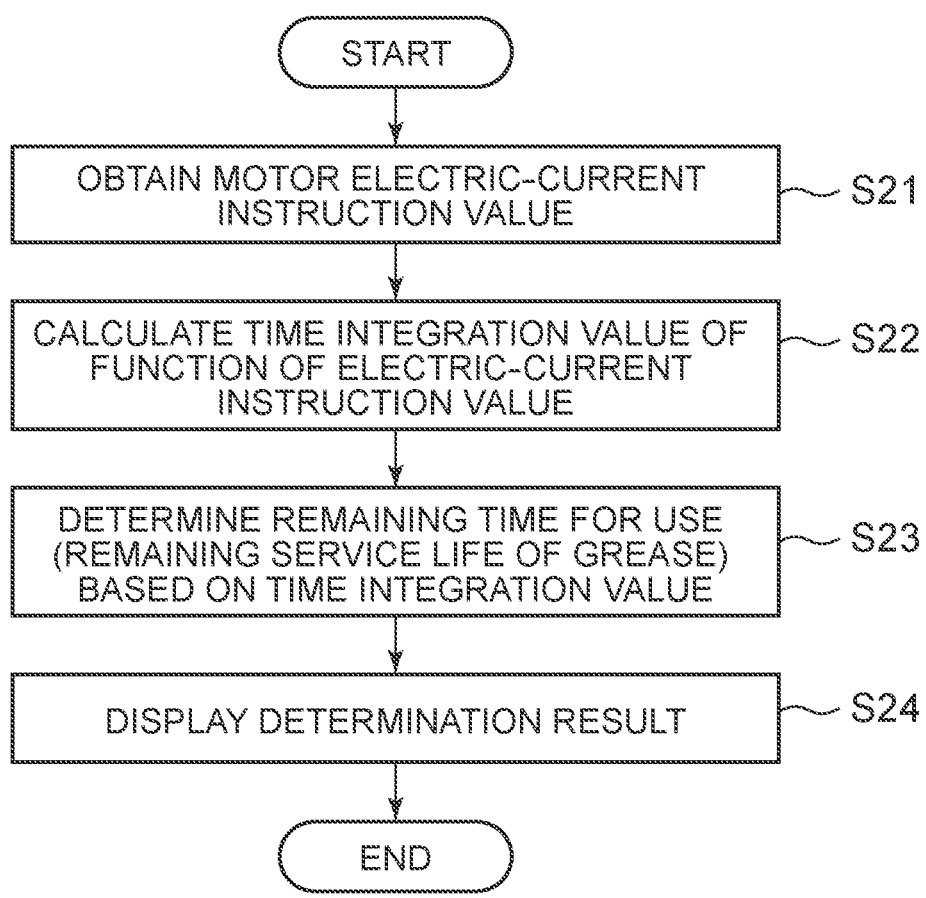
FIG. 9 is a flowchart illustrating an example of the operation of a deterioration diagnosis apparatus, such as shown in FIG. 8.

Next, the operation of the deterioration diagnosis apparatus 1A configured as above is described. The operation of the deterioration diagnosis apparatus 1A also means a deterioration diagnosis method according to the present embodiment. FIG. 9 is a flowchart illustrating the operation of the deterioration diagnosis apparatus 1A, such as shown in FIG. 8.

First, the operation of the robot, which is the mechanical apparatus 10, is started. In this state, the deterioration diagnosis apparatus 1A obtains time series data on the electric-current instruction value 23 from the controller 20 (step S21 in FIG. 9).

Next, the deterioration diagnosis apparatus 1A calculates the time integral value of the function expressing the consumption rate of the additive, based on the time series data on the electric-current instruction value obtained by the electric-current-instruction-value obtaining unit 5 (step S22 in FIG. 9). As described above, the consumption rate of the additive is expressed by a quadratic function of the electric-current instruction value (see expression (1)).

Figure 10:
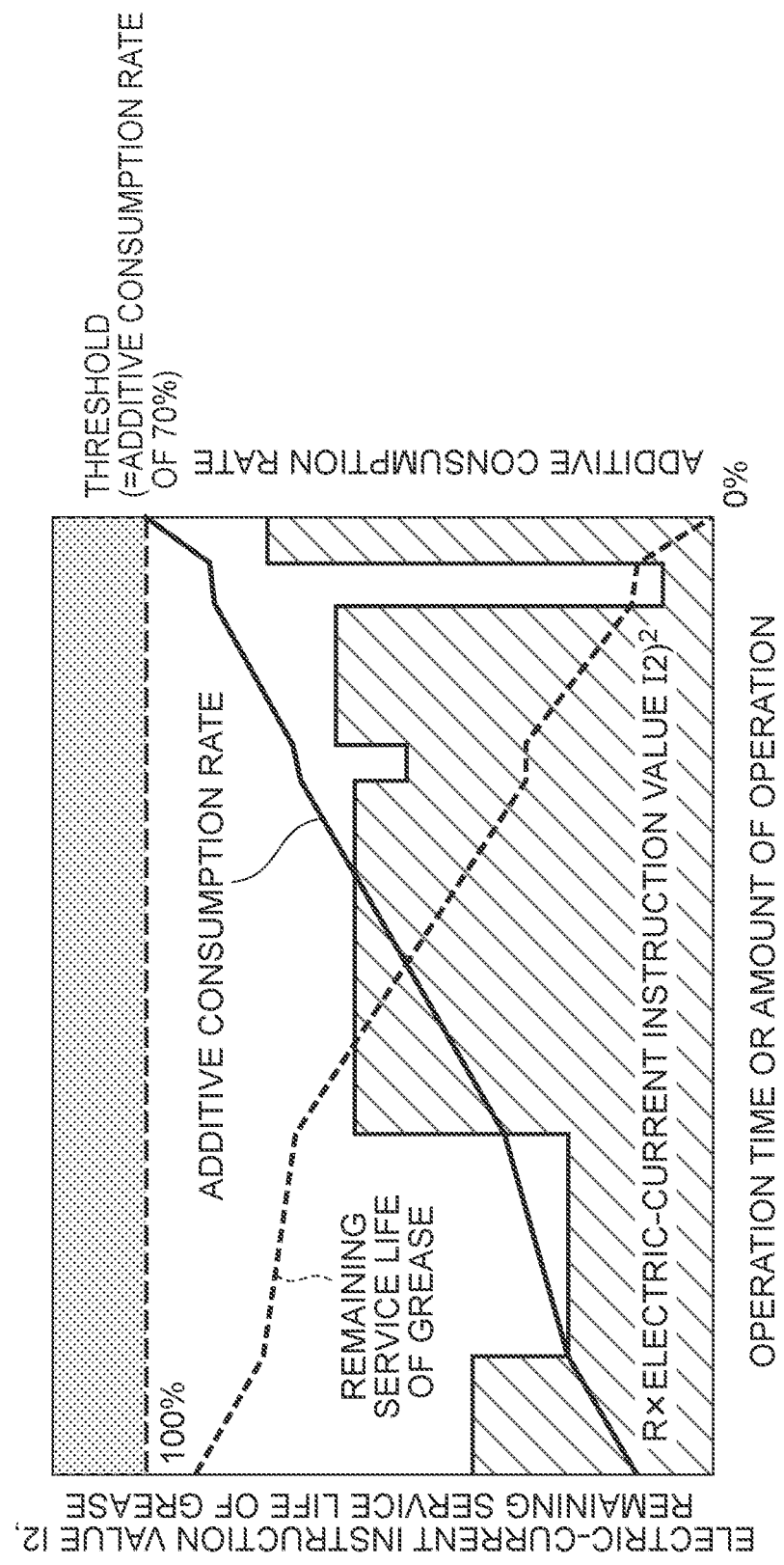
FIG. 10 is a graph illustrating the time integral value of a function of the electric-current instruction value calculated in a deterioration diagnosis apparatus, such as shown in FIG. 8.

Next, the deterioration diagnosis apparatus 1A determines the period to be taken for the consumption rate of the additive to reach a predetermined value (step S23 in FIG. 9). FIG. 10 is a graph illustrating the time integral value of the function of the electric-current instruction value 12 calculated in the deterioration diagnosis apparatus 1A. In FIG. 10, the solid line represents the additive consumption rate, the dashed line represents the remaining service life of the grease, and the hatching represents the integral value of the function. As illustrated in FIG. 10, the determination unit 3A calculates the time integral value of the function based on the time series data on the electric-current instruction value 12 obtained by the electric-current-instruction-value obtaining unit 5 to calculate the period to be taken for the consumption rate of the additive to reach a threshold set in advance (additive consumption rate of 70%), and the determination unit 3A determines the remaining time for use (or the remaining service life of the grease). Although the threshold of the additive consumption rate is set to 70% in the present embodiment, the threshold may be changed as appropriate depending on the type of grease, the components of the speed reducer, and other factors.

Figure 11:
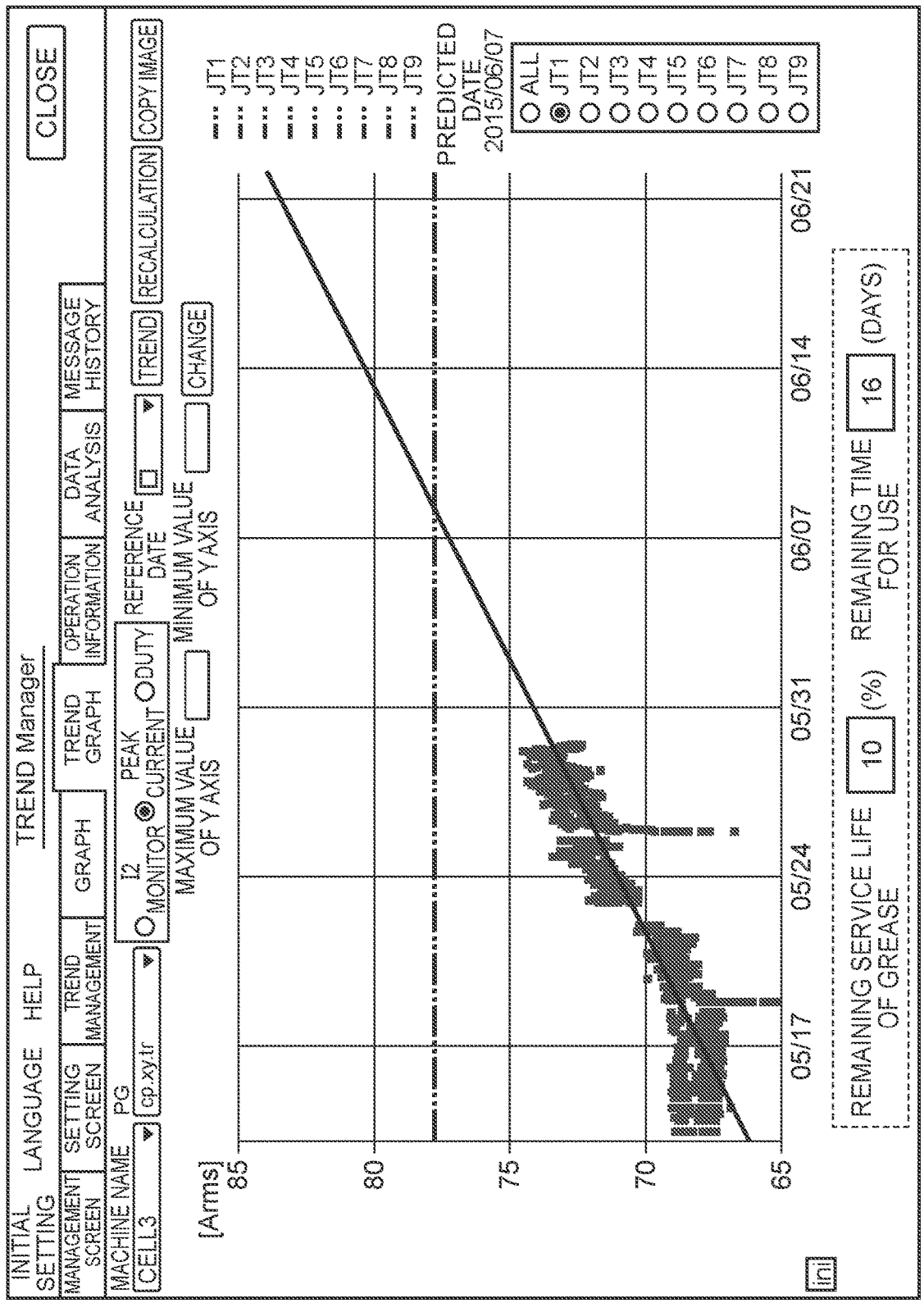
FIG. 11 is a diagram illustrating an example of a display screen of a deterioration diagnosis result.

Lastly, the deterioration diagnosis apparatus 1A outputs the determination result (step S24 in FIG. 9). Specifically, the output unit 4 outputs the determination result (the remaining time for use or the remaining service life of the grease) determined by the determination unit 3. FIG. 11 is a diagram illustrating an example of a display screen of a deterioration diagnosis result. In FIG. 11, the X axis represents the number of operating days, and the Y axis represents the effective value of the electric-current instruction value. A lower part of the screen indicates the current remaining service life of the grease (10%) and the remaining time for use (16 days).

Although the deterioration diagnosis method according to the present embodiment (see FIG. 9) is an operation of the deterioration diagnosis apparatus 1A performed in the deterioration diagnosis apparatus 1A (see FIG. 8), the deterioration diagnosis method of the present embodiment may be performed by an operator. For example, all the operation in steps S21 to S24 in FIG. 9 may be performed by an operator, or part of the operation (for example, in steps S22 and S23) may be performed by an operator. In the case where an operator performs the deterioration diagnosis method, the method may include the step of deriving a correlation between the electric-current instruction value I2 (A) and the additive consumption rate (%).

[Operational Advantage]

In the present embodiment as above, since the consumption rate of the additive can be expressed by a quadratic function of the motor electric-current instruction value (see expression (1)), the remaining service life of a robot can be predicted with high accuracy by always monitoring the electric-current instruction value and calculating the time integral value of the function.

Although the relational expression between the additive consumption rate and the electric-current instruction value is derived by the least square method in the present embodiment, the relational expression may be derived through another regression analysis approach. The additive consumption rate may be expressed not only by a quadratic function of the electric-current instruction value but also by a cubic or higher-order function.

In the present embodiment, the consumption rate of the additive is expressed by a function of the electric-current instruction value (a function of the square of the electric-current instruction value), but the function expressing the consumption rate of the additive is not limited to a function of the electric-current instruction value because the output of the speed reducer varies depending on the load. In other words, the consumption rate of the additive may be expressed by a function of at least one of an instruction value and a measurement value related to the output. Specifically, the consumption rate of the additive may be expressed by a function of the motor current 22 (for example, a function of the square of the measurement value of the motor current 22), or the additive consumption rate may be expressed by a function of the angular velocity calculated based on the rotation angle of the motor 13 inputted from the encoder 15 (for example, a function of the square of the angular velocity). Alternatively, the consumption rate of the additive may also be expressed by a function of both of the electric-current instruction value and the angular velocity of the rotation angle (for example, a function of the current×the angular velocity). With these approaches, the period to be taken for the consumption rate of the additive to reach a predetermined value can be determined by always monitoring these values and calculating the time integral value of the function.

Knowledge (3) Underlying Present Invention

Figure 16:
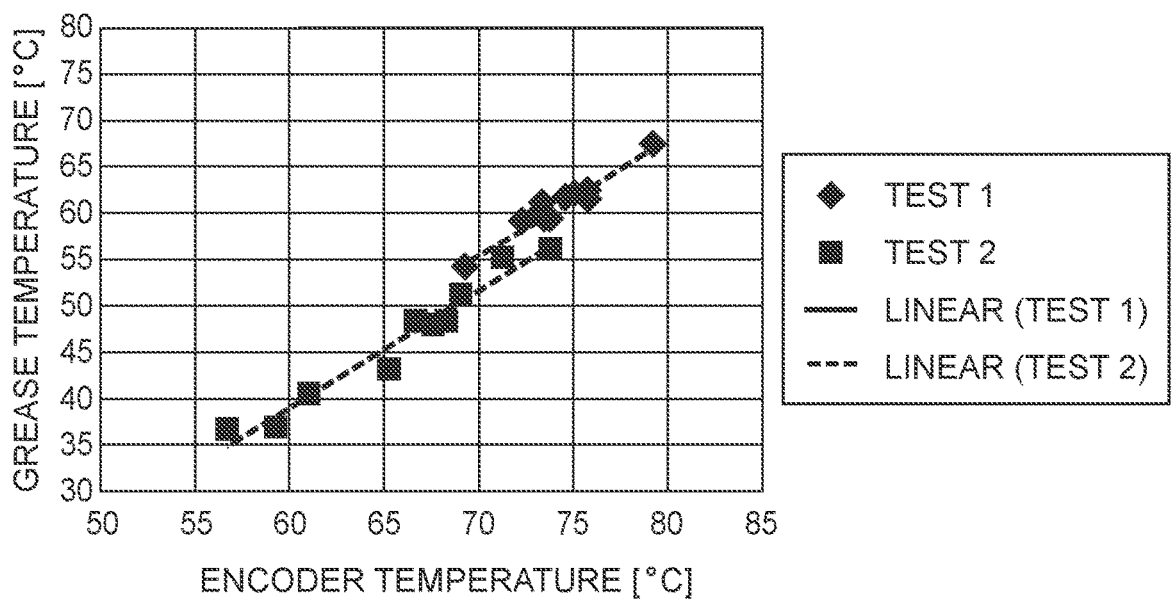
FIG. 16 is a graph illustrating measurement results of the temperature of an encoder and the temperature of grease.

In order to further improve the accuracy in predicting the remaining service lives of robots, the inventors focused attention on the temperature of the grease (lubricant) as another factor that affects the consumption rate of the additive. An industrial robot is provided with temperature sensors for temperature monitoring, at the encoders that detect the rotation positions of the motors. In this respect, the inventors first measured the temperature detected by a temperature sensor of the encoder and the grease temperature at the same time and studied the relationship between these. FIG. 16 is a graph illustrating the measurement results of the encoder temperature and the grease temperature. Here, the vertical axis represents the grease temperature, and the horizontal axis represents the encoder temperature. Here, endurance tests were conducted by making the robot repeat a certain action. The graph illustrates results of two tests for the case where the robot repeated different actions (the diamond-shaped points and the square points). In proportion to the increase in the encoder temperature, the temperature of the grease inside the speed reducer also increases. In other words, it was found that there is a linear correlation between the encoder temperature detected by the temperature sensor and the grease temperature. Hence, the linear correlation between them makes it possible to estimate the grease temperature from the detection value of the encoder temperature without adding a new sensor in the industrial robot.

Figure 17:
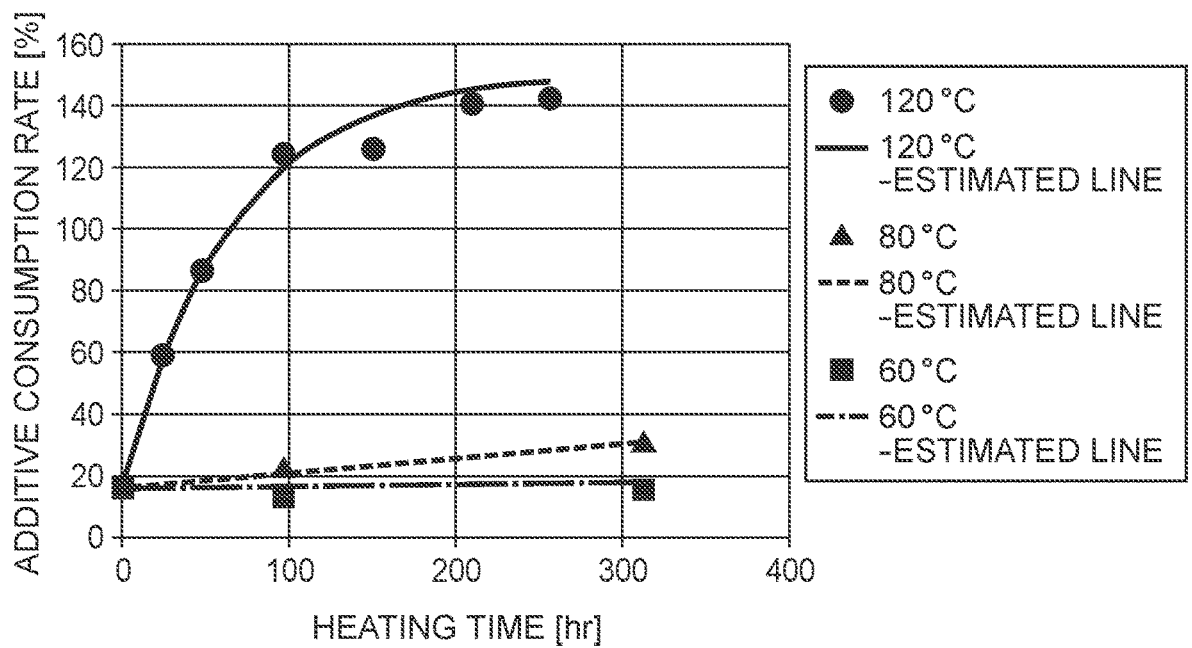
FIG. 17 is a graph illustrating results of thermal deterioration tests for grease.

Next, the inventors studied how the grease temperature affects the consumption rate of the additive contained in the grease. Specifically, the inventors conducted thermal deterioration tests for the grease and studied the change in the consumption rate of the additive for the case in which the grease is heated for a certain time. Here, measurement was made while the grease was heated for a certain time from grease temperatures of 60° C., 80° C., and 120° C. FIG. 17 is a graph illustrating the results. The vertical axis represents the consumption rate of the additive, and the horizontal axis represents heating time. In the case of grease temperatures of 60° C. (the square points in the graph) and 80° C. (the triangle points in the graph), the additive consumption rate remained low even though the grease was heated for a long time. In contrast, in the case of a grease temperature of 120° C. (the dot-shaped points in the graph), the additive consumption rate rapidly increased when the grease was heated. If the grease temperature is 70° C. or less, the effect of heating to the consumption rate of the additive can be ignored, but if the grease temperature is more than 70° C., the effect of heating is significant. From these test results, the reaction rate of the additive can be estimated at a grease temperature in the range of 60° C. to 120° C. using the Arrhenius equation which is a known approach. Of the consumption rate of the additive, a function dependent on the grease temperature can be expressed by the product of the reaction rate constant at the temperature of the lubricant and the additive residual rate per unit time.

With this, the consumption rate of the additive can be separated into a function dependent on the grease temperature and a function independent of the grease temperature. Here, since the consumption rate of the additive can be considered to be proportional to the work of the speed reducer (the product of the torque and the angular velocity of the shaft of the speed reducer), the function independent of the grease temperature, of the additive consumption rate, can be expressed by a function of the motor electric-current instruction value and the angular velocity of the shaft of the speed reducer. Since the angular velocity of the shaft of the speed reducer can be calculated from the angular velocity of the rotation angle of the motor, the function independent of the grease temperature can be expressed by a function of the motor electric-current instruction value and the angular velocity of the rotation angle of the motor.

Hence, according to the above knowledge, since the consumption rate of the additive in industrial robots can be expressed by the sum of a first function which is a function of the electric-current instruction value of the motor and the angular velocity of the rotation angle of the motor and a second function which is a function of the measurement value of the temperature of the lubricant, if the temperature of the lubricant is always monitored along with the motor electric-current instruction value and the detection value of the encoder, and the time integral value of this function is calculated, the remaining service life of the robot can be predicted with high accuracy.

Note that the above knowledge can obviously be applied not only to robots having bearings and speed reducers but also to mechanical apparatuses (for example, hydraulic pumps) having transmission mechanisms that transmit power via gears.

The inventors conceived the present invention based on the above knowledge. Hereinafter, one or more embodiments are described with reference to attached drawings. In the following, the same or equivalent constituents are denoted by the same reference symbols in all the drawings, and repetitive description thereof is omitted.

Third Embodiment

Next, a third embodiment is described. The basic configuration of a deterioration diagnosis apparatus according to the present embodiment is the same as or a similar to that of the second embodiment. In the following, description of the configurations of constituents in common with the second embodiment is omitted, and only different configurations are described.

Figure 14:
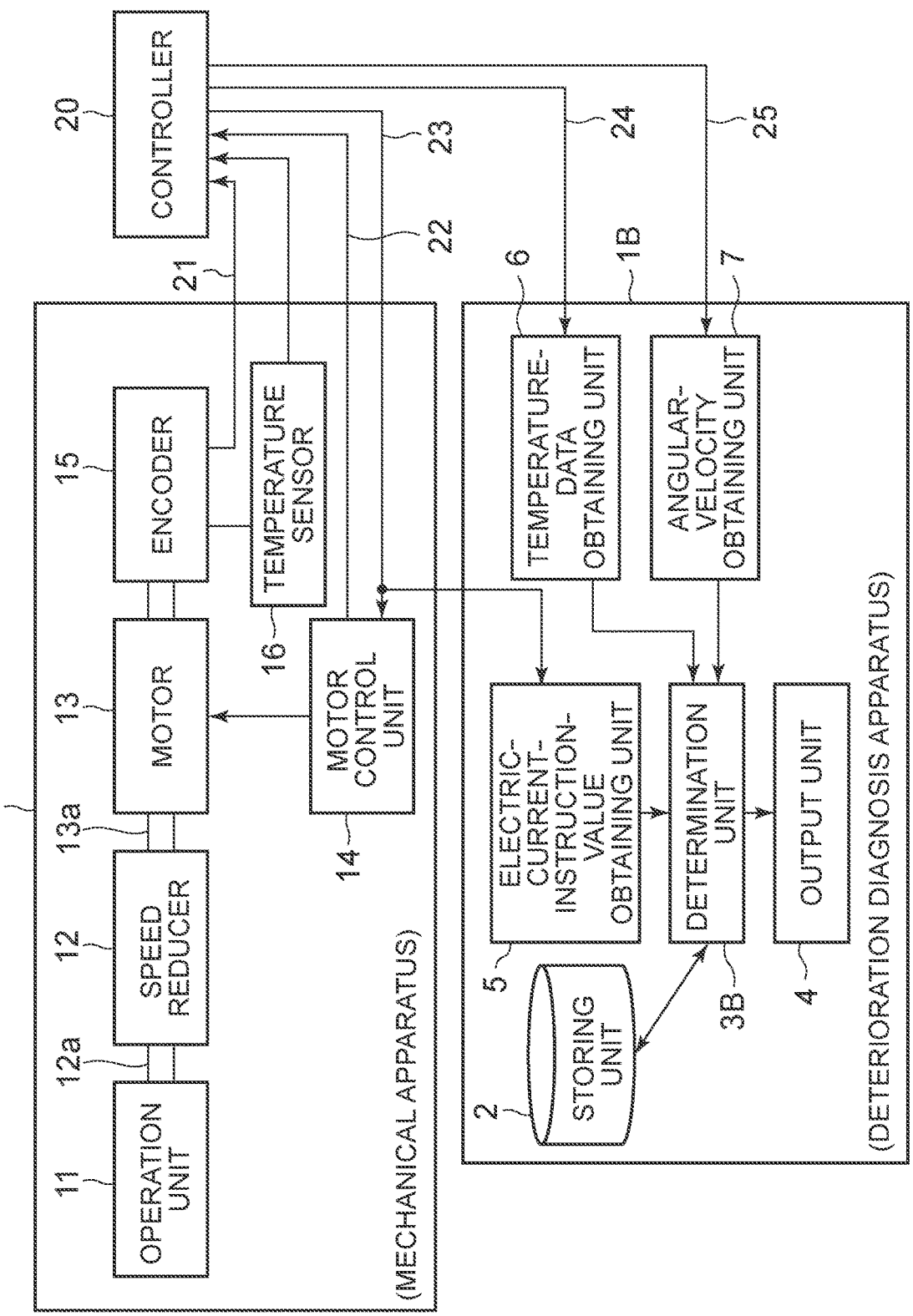
FIG. 14 is a functional block diagram illustrating the configuration of a deterioration diagnosis apparatus for a mechanical apparatus according to one or more embodiments.

FIG. 14 is a functional block diagram illustrating the configuration of a deterioration diagnosis apparatus 1B according to one or more embodiments. As illustrated in FIG. 14, this embodiment may be different from the second embodiment (FIG. 8) in that the deterioration diagnosis apparatus 1B further includes a temperature-data obtaining unit 6 that obtains time series data on the grease temperature.

In addition, the encoder 15 is provided with a temperature sensor 16 for temperature monitoring, and the controller 20 obtains data on the temperature of the encoder 15 detected by the temperature sensor 16 (and stores it temporarily). The controller 20 has a safety function of stopping the operation of the robot when the value of the temperature of the encoder 15 is equal to or higher than a specified temperature (for example, 90° C.). In the present embodiment, the controller 20 estimates the grease temperature based on the linear correlation from the value of the temperature of the encoder 15 detected by the temperature sensor 16 and outputs an estimation value 24 of the grease temperature to the temperature-data obtaining unit 6.

The temperature-data obtaining unit 6 obtains the estimation value 24 of the grease temperature inputted from the controller 20 and outputs time series data on the estimation value 24 of the grease temperature to the determination unit 3B.

In the present embodiment, the deterioration diagnosis apparatus 1B further includes an angular-velocity obtaining unit 7 that obtains the angular velocity of the shaft of the speed reducer 12. The controller 20 calculates the angular velocity 25 of the shaft of the speed reducer 12 from the rotation angle 21 of the motor 13 and outputs it to the angular-velocity obtaining unit 7.

The angular-velocity obtaining unit 7 obtains the angular velocity 25 of the shaft of the speed reducer 12 and outputs time series data on the angular velocity 25 of the shaft of the speed reducer 12 to the determination unit 3B.

The determination unit 3B calculates the time integral value of the function (the sum of the first function and the second function) based on the inputted time series data to determine the period to be taken for the consumption rate of the additive to reach a predetermined value.

[Operation]

Figure 15:
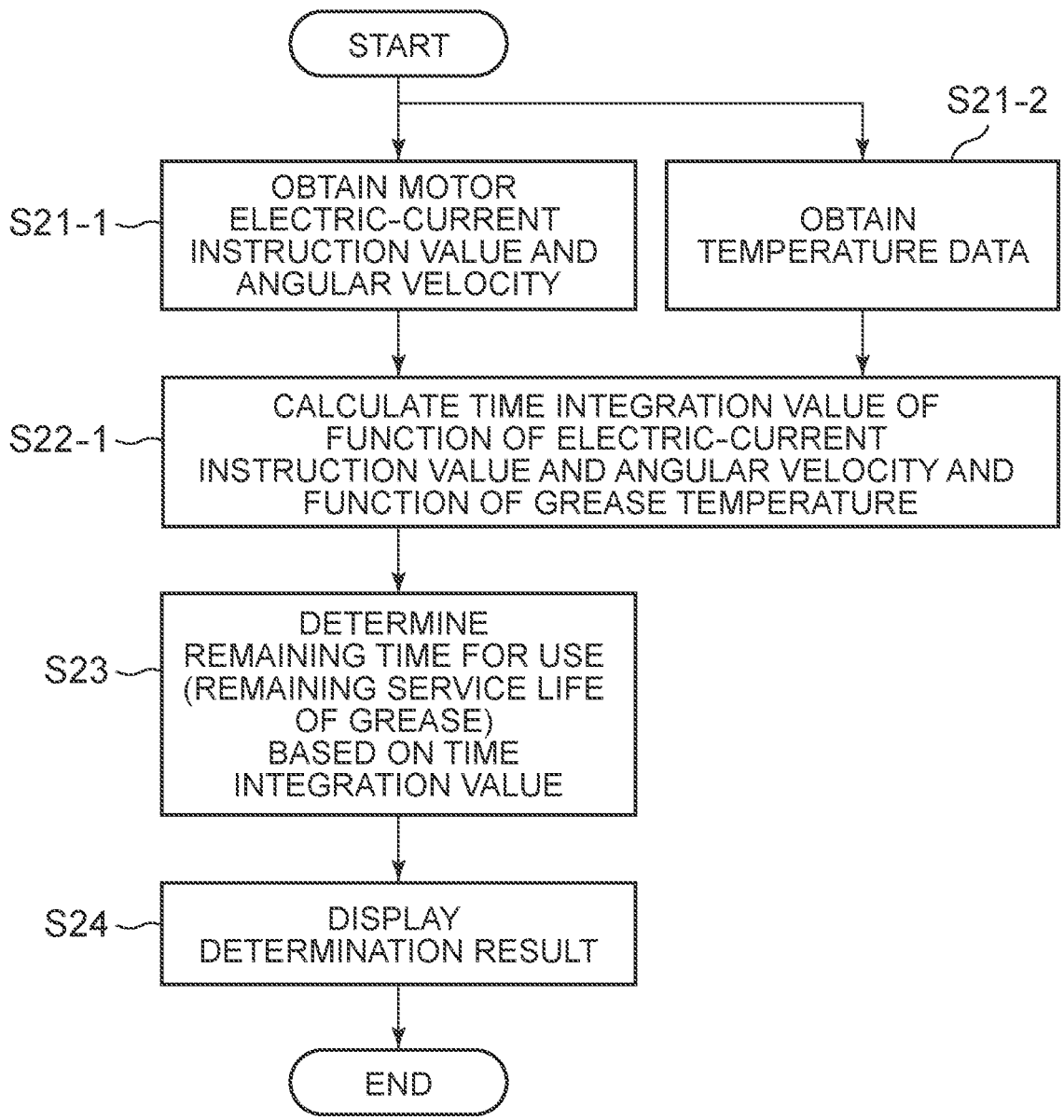
FIG. 15 is a flowchart illustrating an example of the operation of a deterioration diagnosis apparatus, such as shown in FIG. 14.

Next, the operation of the deterioration diagnosis apparatus 1B configured as above is described. The operation of the deterioration diagnosis apparatus 1B also means a deterioration diagnosis method according to the present embodiment. FIG. 15 is a flowchart illustrating the operation of the deterioration diagnosis apparatus 1B in FIG. 14.

First, the operation of the robot, which is the mechanical apparatus 10, is started. In this state, the deterioration diagnosis apparatus 1B obtains time series data on the electric-current instruction value 23 and the angular velocity 25 of the shaft of the speed reducer 12 from the controller 20 (step S21-1 in FIG. 15). The deterioration diagnosis apparatus 1B also obtains time series data on the estimation value 24 of the grease temperature from the controller 20 (step S21-2 in FIG. 15).

Next, the deterioration diagnosis apparatus 1B calculates the time integral value of the function expressed by the sum of a function of the motor electric-current instruction value 23 and the angular velocity 25 of the shaft of the speed reducer 12 and a function of the estimation value 24 of the grease temperature (step S22-1 in FIG. 15).

Next, the deterioration diagnosis apparatus 1B determines the period to be taken for the consumption rate of the additive to reach a predetermined value (step S23 in FIG. 15).

Lastly, the deterioration diagnosis apparatus 1B outputs the determination result (step S24 in FIG. 15). Specifically, the output unit 4 outputs the determination result (the remaining time for use or the remaining service life of the grease) determined by the determination unit 3B.

Although the deterioration diagnosis method according to the present embodiment (see FIG. 15) is an operation of the deterioration diagnosis apparatus 1B performed in the deterioration diagnosis apparatus 1B (see FIG. 14), the deterioration diagnosis method of the present embodiment may be performed by an operator. For example, all the operation in steps S21-1 to S24 in FIG. 15 may be performed by an operator, or part of the operation (for example, in steps S21-1 and S21-2) may be performed by an operator.

[Operational Advantage]

In the present embodiment, as described above, since the consumption rate of the additive can be expressed by the sum of the first function which is a function of the motor electric-current instruction value 23 and the angular velocity 25 of the shaft of the speed reducer 12 and the second function which is a function of the estimation value 24 of the grease temperature, the remaining service life of a robot can be predicted with high accuracy by always monitoring not only the motor electric-current instruction value and the detection value of the encoder but also the grease temperature and calculating the time integral value of this function.

In conventional technique, the amount of iron powder in the grease gradually increases with the progress of the wear, and just before the speed reducer or the like fails, an increase in the amount of iron powder is detected as an abnormal increase. Hence, a trend of deterioration leading to a failure cannot be caught in a stage before the stage when abnormal wear occurs, and thus the accuracy in failure prediction is limited. This is not a problem only for robots having bearings and speed reducers but a problem common to all mechanical apparatuses having power transmission mechanisms that transmit power via gears.

One or more embodiments may provide a deterioration diagnosis apparatus capable of predicting the remaining service life of a mechanical apparatus with high accuracy.

With one or more embodiments described above, the trend of change along with the operation of the mechanical apparatus, in the consumption rate of the additive is stored in advance, and this makes it possible to catch a trend of deterioration leading to a failure in a stage before abnormal wear occurs. Thus, a mechanical apparatus can be diagnosed in terms of deterioration based on the trend of change in the consumption rate of the additive. The remaining service life of the mechanical apparatus can be predicted with high accuracy by determining the period to be taken for the consumption rate of the additive to reach the predetermined value.

The trend of change in the consumption rate of the additive is linear increase. With the above configuration, the trend of change in the consumption rate of the additive can be approximated with a straight line, and thus it is easy to determine the period to be taken for the consumption rate of the additive to reach the predetermined value. This improves the prediction accuracy. Note that the trend of change in the additive consumption rate can be obtained from measurement results. The statement that the trend of change in the consumption rate of the additive is linear increase is not limited to linear increase in a strict sense. For example, it includes a case in which after the measurement value increases, it once slightly decreases, and then, the measurement value increases linearly.

The consumption rate of the additive may be expressed by a function of at least one of an instruction value and a measurement value related to an output of the power transmission mechanism, the deterioration diagnosis apparatus may further comprise a data obtaining unit that obtains time series data on the at least one of the instruction value and the measurement value, and the determination unit may determine the period to be taken for the consumption rate of the additive to reach a predetermined value by calculating a time integral value of the function, based on the time series data obtained.

With the above configuration, the output varies according to the load, and hence the consumption rate of the additive can be expressed by a function of at least one of an instruction value and a measurement value related to the output. The period to be taken for the consumption rate of the additive to reach the predetermined value can be determined by always monitoring these values and calculating the time integral value of the above function. This improves the prediction accuracy.

The mechanical apparatus may comprise a motor configured to drive an operation unit, a speed reducer configured to reduce speed of rotational power of the motor and transmits the resultant rotational power to the operation unit, an encoder configured to detect a rotation position of the motor, and a motor control unit that controls electric current supplied to the motor to control the rotation of the motor, and the instruction value may be an electric-current instruction value for the motor.

With the above configuration, the consumption rate of the additive can be expressed by a function (for example, a quadratic function) of the electric-current instruction value for the motor, for example, for a robot having motors and speed reducers (power transmission mechanisms). Thus, the remaining service life of the robot can be predicted with high accuracy by always monitoring the electric-current instruction value and calculating the time integral value of the above function.

The mechanical apparatus may comprise a motor configured to drive an operation unit, a speed reducer configured to reduce speed of rotational power of the motor and transmit the resultant rotational power to the operation unit, an encoder configured to detect a rotation angle of the motor, and a motor control unit that controls electric current supplied to the motor to control the rotation of the motor, and the measurement value may be a detection value of the encoder.

With the above configuration, for example, for a robot having motors and speed reducers (power transmission mechanisms), the consumption rate of the additive can be expressed by a function (for example, a quadratic function) of the angular velocity of the motor rotation angle obtained from the detection value (measurement value) of the encoder. Thus, the remaining service life of the robot can be predicted with high accuracy by always monitoring the detection value of the encoder and calculating the time integral value of the above function. Alternatively, the consumption rate of the additive may be expressed by a function of the electric-current instruction value for the motor and the angular velocity of the motor rotation angle obtained from the detection value (measurement value) of the encoder, and the time integral value of the above function may be calculated by monitoring both the electric-current instruction value and the detection value of the encoder.

The additive may comprise an extreme pressure agent, and the trend of change in a consumption rate of the extreme pressure agent may be linear increase. With the above configuration, the trend of change in the consumption rate of the extreme pressure agent contained in the additive is linear increase, and thus the prediction accuracy is improved. Note that the extreme pressure agent may include an anti-wear agent.

The consumption rate of the additive may be expressed by a third function that is a sum of a first function that is a function of an electric-current instruction value for the motor and angular velocity of the rotation angle of the motor and a second function that is a function of temperature of the lubricant, the data obtaining unit may obtain time series data on the electric-current instruction value for the motor, a detection value of the encoder, and the temperature of the lubricant, and the determination unit may determine the period to be taken for the consumption rate of the additive to reach a predetermined value by calculating a time integral value of the third function, based on the time series data obtained. With the above configuration, the additive consumption rate can be expressed by the sum of the first function which is a function of the electric-current instruction value for the motor and the angular velocity of the rotation angle of the motor and the second function which is a function of the temperature of the lubricant. Thus, the remaining service life of the robot can be predicted with high accuracy by always monitoring not only the motor electric-current instruction value and the detection value of the encoder but also the temperature of the lubricant and calculating the time integral value of the above third function. The second function may be a function of the temperature of the lubricant and a residual rate of the additive per unit time. The mechanical apparatus may further comprise a temperature sensor for the encoder. The data obtaining unit may receive an input of temperature data detected by the temperature sensor, and the data obtaining unit may obtain time series data on the temperature of the lubricant from a value of the temperature of the encoder detected by the temperature sensor based on a linear correlation. With the above configuration, it is possible to estimate the temperature of the grease from the detection value of the encoder temperature, without adding a new sensor in the industrial robot. The deterioration diagnosis apparatus for a mechanical apparatus may further comprising an output unit that outputs a determination result determined by the determination unit.

The present invention has the configurations described above and provides the advantageous effect that the remaining service life of a mechanical apparatus having power transmission mechanisms such as speed reducers can be predicted with high accuracy.

From the above description, it is obvious to those skilled in the art that there are various improvements and other embodiments. The above description has been provided for the purpose of teaching those skilled in the art the best mode for implementing the present invention, and hence it should be interpreted as examples. Details of the structure and/or function can be substantially changed without departing from the spirit thereof.

The present invention is useful for diagnosing, in terms of deterioration, mechanical apparatuses having power transmission mechanisms such as speed reducers.

The invention claimed is:

1. A deterioration diagnosis apparatus for a mechanical apparatus comprising a gear, the deterioration diagnosis apparatus comprising:
   a storage that stores a trend of change during operation of the mechanical apparatus in a consumption rate of an additive contained in lubricant used for the gear; and
   a computer or circuitry configured to perform operations comprising:
      reading, from the storage, the trend of change; and
      determining a period to be taken for the consumption rate of the additive to reach a predetermined value, based on the trend of change in the consumption rate of the additive.

2. The deterioration diagnosis apparatus for a mechanical apparatus according to claim 1, wherein
   the trend of change in the consumption rate of the additive is a linear increase.

3. The deterioration diagnosis apparatus for a mechanical apparatus according to claim 1, wherein
   the additive comprises an extreme pressure agent, and
   the trend of change in a consumption rate of the extreme pressure agent is a linear increase.

4. The deterioration diagnosis apparatus for a mechanical apparatus according to claim 1, wherein
   the computer or circuitry is configured to perform operations further comprising outputting the determined period.

5. The deterioration diagnosis apparatus for a mechanical apparatus according to claim 1, wherein
   the consumption rate of the additive is expressed by a function of at least one of an instruction value and a measurement value related to an output of a power transmission mechanism of the mechanical apparatus configured to transmit power via the gear,
   the computer or circuitry is configured to perform operations further comprising obtaining time series data on the at least one of the instruction value and the measurement value, and
   the computer or circuitry is configured to perform operations such that determining the period to be taken for the consumption rate of the additive to reach the predetermined value comprises determining the period to be taken for the consumption rate of the additive to reach the predetermined value by calculating a time integral value of the function, based on the time series data obtained.

6. The deterioration diagnosis apparatus for a mechanical apparatus according to claim 5, wherein
   the mechanical apparatus further comprises a motor configured to drive an operation unit, a speed reducer configured to reduce speed of rotational power of the motor and transmit the resultant rotational power to the operation unit, an encoder configured to detect a rotation position of the motor, and a motor control unit that controls electric current supplied to the motor to control the rotation of the motor, and
   the instruction value is an electric-current instruction value for the motor.

7. The deterioration diagnosis apparatus for a mechanical apparatus according to claim 5, wherein
   the mechanical apparatus further comprises a motor configured to drive an operation unit, a speed reducer configured to reduce speed of rotational power of the motor and transmit the resultant rotational power to the operation unit, an encoder configured to detect a rotation angle of the motor, and a motor control unit that controls electric current supplied to the motor to control the rotation of the motor, and the measurement value is a detection value of the encoder.

8. The deterioration diagnosis apparatus for a mechanical apparatus according to claim 5, wherein the mechanical apparatus further comprises a motor configured to drive an operation unit, a speed reducer configured to reduce speed of rotational power of the motor and transmit the resultant rotational power to the operation unit, an encoder configured to detect a rotation angle of the motor, and a motor control unit that controls electric current supplied to the motor to control the rotation of the motor, the consumption rate of the additive is expressed by a third function that is a sum of a first function that is a function of an electric-current instruction value for the motor and angular velocity of the rotation angle of the motor and a second function that is a function of temperature of the lubricant, and the computer or circuitry is configured to perform operations such that obtaining the time series data comprises obtaining the time series data on the electric-current instruction value for the motor, a detection value of the encoder, and the temperature of the lubricant, and determining the period to be taken for the consumption rate of the additive to reach the predetermined value comprises determining the period to be taken for the consumption rate of the additive to reach the predetermined value by calculating a time integral value of the third function, based on the time series data obtained.

9. The deterioration diagnosis apparatus for a mechanical apparatus according to claim 8, wherein the second function is a function of the temperature of the lubricant and a residual rate of the additive per unit time.

10. The deterioration diagnosis apparatus for a mechanical apparatus according to claim 8, wherein the mechanical apparatus further comprises a temperature sensor for detecting a temperature of the encoder, and the computer or circuitry is configured to perform operations such that obtaining the time series data comprises receiving temperature data on the temperature of the encoder detected by the temperature sensor, to thereby obtain the time series data on the temperature of the lubricant based on a linear correlation.

11. A deterioration diagnosis method performed by a computer for diagnosing a deterioration of a lubricant during operation of a mechanical apparatus comprising a gear, the computer comprising a storage, the deterioration diagnosis method comprising:

storing, by the computer in the storage, a trend of change during operation of the mechanical apparatus in a consumption rate of an additive contained in the lubricant used for the gear;

reading, by the computer, from the storage, the trend of change; and determining, by the computer, a period to be taken for the consumption rate of the additive to reach a predetermined value, based on the trend of change in the consumption rate of the additive.

12. The deterioration diagnosis method according to claim 11, wherein the trend of change in the consumption rate of the additive is a linear increase.

13. The deterioration diagnosis method according to claim 11, wherein the additive comprises an extreme pressure agent, and the trend of change in a consumption rate of the extreme pressure agent is a linear increase.

14. The deterioration diagnosis method according to claim 11, wherein the consumption rate of the additive is expressed by a function of at least one of an instruction value and a measurement value related to an output of a power transmission mechanism of the mechanical apparatus configured to transmit power via the gear, the deterioration diagnosis method further comprises obtaining time series data on the at least one of the instruction value and the measurement value, and determining the period to be taken for the consumption rate of the additive to reach the predetermined value comprises determining the period to be taken for the consumption rate of the additive to reach the predetermined value by calculating a time integral value of the function, based on the time series data obtained.

15. The deterioration diagnosis method according to claim 14, wherein the mechanical apparatus further comprises a motor configured to drive an operation unit, a speed reducer configured to reduce speed of rotational power of the motor and transmit the resultant rotational power to the operation unit, an encoder configured to detect a rotation position of the motor, and a motor control unit that controls electric current supplied to the motor to control the rotation of the motor, and the instruction value is an electric-current instruction value for the motor.

16. The deterioration diagnosis method according to claim 14, wherein the mechanical apparatus further comprises a motor configured to drive an operation unit, a speed reducer configured to reduce speed of rotational power of the motor and transmit the resultant rotational power to the operation unit, an encoder configured to detect a rotation angle of the motor, and a motor control unit that controls electric current supplied to the motor to control the rotation of the motor, and the measurement value is a detection value of the encoder.

17. The deterioration diagnosis method according to claim 14, wherein the mechanical apparatus further comprises a motor configured to drive an operation unit, a speed reducer configured to reduce speed of rotational power of the motor and transmit the resultant rotational power to the operation unit, an encoder configured to detect a rotation angle of the motor, and a motor control unit that controls electric current supplied to the motor to control the rotation of the motor, the consumption rate of the additive is expressed by a third function that is a sum of a first function that is a function of an electric-current instruction value for the motor and angular velocity of the rotation angle of the motor and a second function that is a function of temperature of the lubricant, obtaining time series data on the at least one of the instruction value and the measurement value comprises obtaining time series data on the electric-current instruction value for the motor, a detection value of the encoder, and the temperature of the lubricant, and determining the period to be taken for the consumption rate of the additive to reach the predetermined value comprises determining the period to be taken for the consumption rate of the additive to reach a predetermined value by calculating a time integral value of the third function, based on the time series data obtained.

18. The deterioration diagnosis method according to claim 17, wherein
the second function is a function of the temperature of the lubricant and a residual rate of the additive per unit time.

19. The deterioration diagnosis method according to claim 17, wherein
the mechanical apparatus further comprises a temperature sensor for the encoder,
obtaining time series data on the at least one of the instruction value and the measurement value comprises an input of temperature data detected by the temperature sensor, and obtaining time series data on the temperature of the lubricant from a value of the temperature of the encoder detected by the temperature sensor based on a linear correlation.

20. A deterioration diagnosis method for a mechanical apparatus comprising a gear, comprising:
measuring a consumption rate of an additive contained in lubricant used for the gear during operation of the mechanical apparatus, by performing, during the operation of the mechanical apparatus, a series of measurements of an amount of the additive precipitated from the lubricant relative to a control amount of the additive in the lubricant;
deriving a trend of change in the consumption rate of the additive, based on the measured consumption rate of the additive; and
determining a period to be taken for the consumption rate of the additive to reach a predetermined value, based on the trend of change in the consumption rate of the additive.

* * * * *